US012042444B2

(12) United States Patent
Cooper et al.

(10) Patent No.: US 12,042,444 B2
(45) Date of Patent: Jul. 23, 2024

(54) PNEUMATIC POWERED MOBILITY CONTROL SYSTEMS

(71) Applicants: University of Pittsburgh - Of the Commonwealth System of Higher Education, Pittsburgh, PA (US); The United States Government as represented by the Department of Veterans Affairs, Washington, DC (US)

(72) Inventors: Rory Alan Cooper, Gibsonia, PA (US); Brandon Joseph Daveler, Dunbar, PA (US); Garrett G. Grindle, Pittsburgh, PA (US); Benjamin Todd Gebrosky, Gibsonia, PA (US)

(73) Assignees: University of Pittsburgh—Of the Commonwealth System of Higher Education, Pittsburgh, PA (US); The United States Government as represented by the Department of Veterans Affairs, Washington, DC (US)

( * ) Notice: Subject to any disclaimer, the term of this patent is extended or adjusted under 35 U.S.C. 154(b) by 519 days.

(21) Appl. No.: 16/966,223

(22) PCT Filed: Jan. 30, 2019

(86) PCT No.: PCT/US2019/015846
§ 371 (c)(1),
(2) Date: Jul. 30, 2020

(87) PCT Pub. No.: WO2019/152518
PCT Pub. Date: Aug. 8, 2019

(65) Prior Publication Data
US 2021/0045945 A1   Feb. 18, 2021

Related U.S. Application Data

(60) Provisional application No. 62/624,162, filed on Jan. 31, 2018.

(51) Int. Cl.
*A61G 5/04* (2013.01)
*A61G 5/02* (2006.01)
(Continued)

(52) U.S. Cl.
CPC ............. *A61G 5/045* (2013.01); *A61G 5/023* (2013.01); *A61G 5/024* (2013.01); *A61G 5/1008* (2013.01);
(Continued)

(58) Field of Classification Search
CPC ........ A61G 5/045; A61G 5/023; A61G 5/024; A61G 5/1008; A61G 5/1051; A61G 5/00;
(Continued)

(56) References Cited

U.S. PATENT DOCUMENTS

| 4,370,857 A | 2/1983 | Miller |
| 4,537,269 A | 8/1985 | Fisher |
| 4,538,826 A * | 9/1985 | Lemarie ................. A61G 5/025 280/244 |

(Continued)

FOREIGN PATENT DOCUMENTS

| CN | 201317435 Y | 9/2009 |
| CN | 105125354 | 12/2015 |

(Continued)

OTHER PUBLICATIONS

Pneumatic Radial Piston Motor, Luftmotorenkatalog_2008_V10. indd, 8, 1-6.
(Continued)

*Primary Examiner* — Kevin Hurley
*Assistant Examiner* — Harold Eric Pahlck, III
(74) *Attorney, Agent, or Firm* — BARTONY & ASSOCIATES, LLC

(57) ABSTRACT

A personal mobility device includes a control system including a manually operated actuator, a first forward control valve having an inlet in fluid connection with a source of pressurized gas and an outlet in fluid connection with a first
(Continued)

forward port of at least a first pneumatic motor, and a first rearward control valve having an inlet in fluid connection with the source of pressurized gas and an outlet in fluid connection with a first rearward port of the first pneumatic motor. Movement of the manually operated actuator controls actuation of the first forward control valve and the first rearward control valve and thereby flow of gas from the source of pressurized gas to the first forward port and the first rearward port.

23 Claims, 20 Drawing Sheets

(51) Int. Cl.
  *A61G 5/10*   (2006.01)
  *B62D 11/04*   (2006.01)
  *G05G 9/047*   (2006.01)

(52) U.S. Cl.
  CPC ............ *A61G 5/1051* (2016.11); *B62D 11/04* (2013.01); *G05G 9/047* (2013.01)

(58) Field of Classification Search
  CPC ............ A61G 5/02; A61G 5/04; B62D 11/04; G05G 9/047; B60K 2026/029; B60K 26/02; B60K 2015/0632; B60K 7/0023; B60K 15/07; B60Y 2200/84
  See application file for complete search history.

(56) References Cited

U.S. PATENT DOCUMENTS

| | | | |
|---|---|---|---|
| 5,675,359 A | 10/1997 | Anderson | |
| 6,106,202 A * | 8/2000 | Nolan | B65G 53/525 |
| | | | 406/10 |
| 2004/0144577 A1 | 7/2004 | Anderson | |
| 2004/0183276 A1 | 9/2004 | Silva | |
| 2004/0261855 A1 | 12/2004 | Hart | |
| 2006/0258964 A1 * | 11/2006 | Biondo | A61H 9/0078 |
| | | | 601/150 |
| 2007/0080000 A1 | 4/2007 | Tobey | |
| 2010/0078245 A1 | 4/2010 | Rolfe | |
| 2011/0253489 A1 | 10/2011 | Ward | |
| 2012/0068435 A1 | 3/2012 | Birmanns | |
| 2012/0132477 A1 * | 5/2012 | Cong | B60K 3/04 |
| | | | 60/412 |
| 2015/0190292 A1 | 7/2015 | Robins | |
| 2015/0298737 A1 | 10/2015 | Kaesgen | |
| 2017/0282874 A1 * | 10/2017 | Alexander | B60T 7/085 |
| 2017/0306869 A1 * | 10/2017 | Luckas | F02D 41/062 |

FOREIGN PATENT DOCUMENTS

| | | |
|---|---|---|
| DE | 19534628 A1 | 5/1996 |
| EP | 2451667 A1 | 5/2012 |
| EP | 3399952 | 11/2018 |
| WO | WO2006046246 A2 | 5/2006 |
| WO | WO2017120184 | 7/2017 |
| WO | WO2019152518 | 8/2019 |

OTHER PUBLICATIONS

Nash, M.S., et al., "Power-assisted wheels ease energy costs and perceptual responses to wheelchair propulsion in persons with shoulder pain and spinal cord injury" Archives of Physical Medicine and Rehabilitation, 2008. 89(11):p. 2080-2085.

* cited by examiner

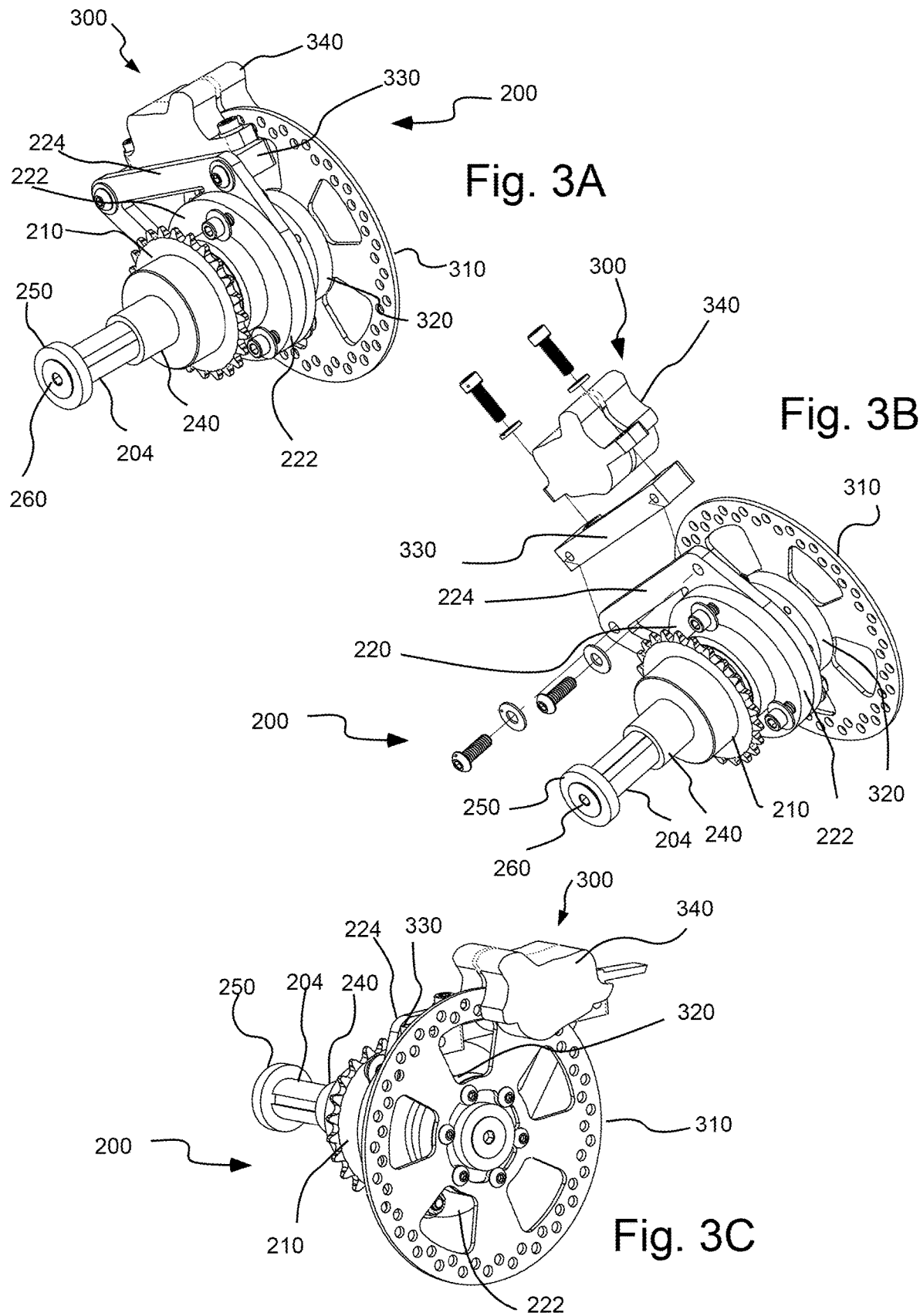

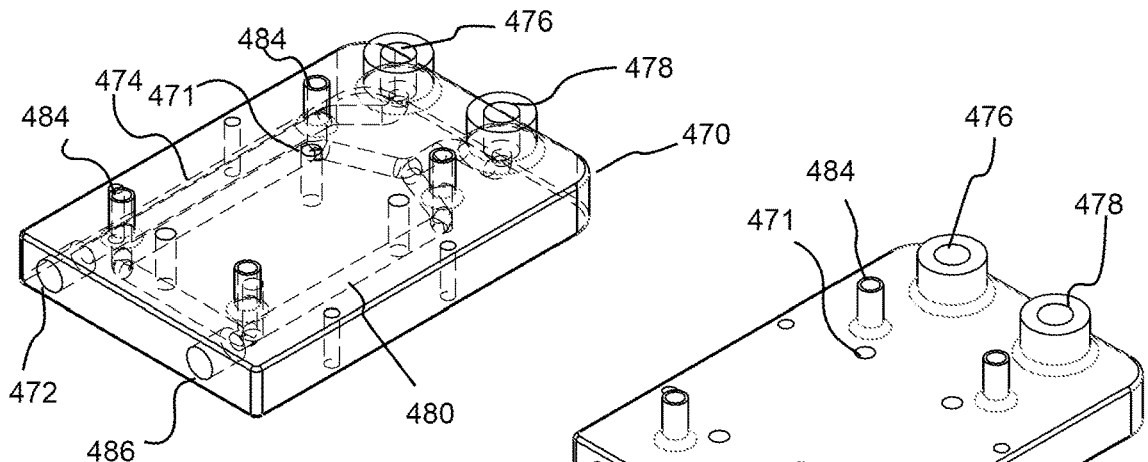
Fig. 5E
Fig. 5F
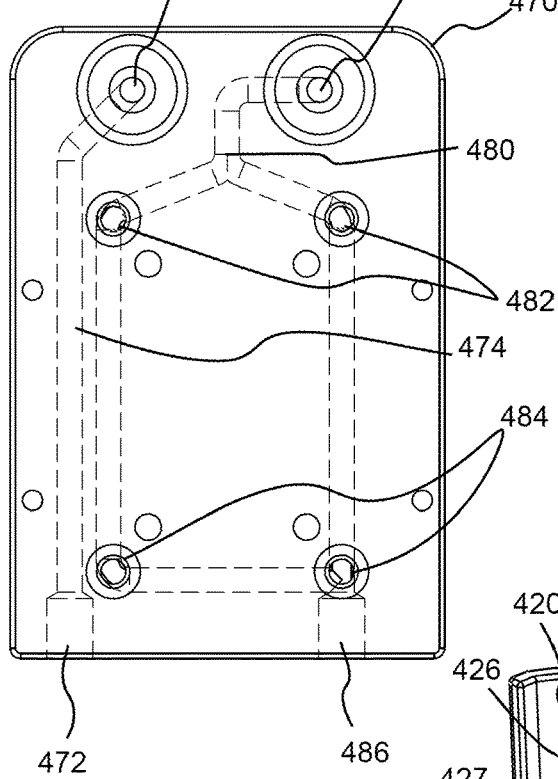
Fig. 5G
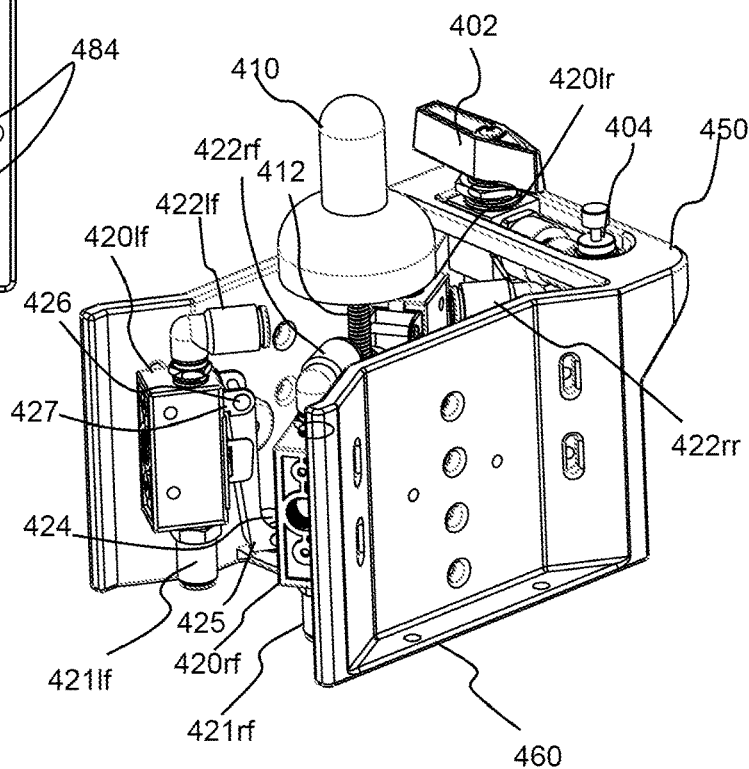
Fig. 5H d1 = required distance to activate directional control valve 420 d2 = width of directional control valve activator 414 d3 = length of diagonal of directional control valve activator 414 d4 = height of directional control valve activator 414

Θ1 = angle of directional control valve roller 424

Θ2 = side angle of directional control valve activator 414

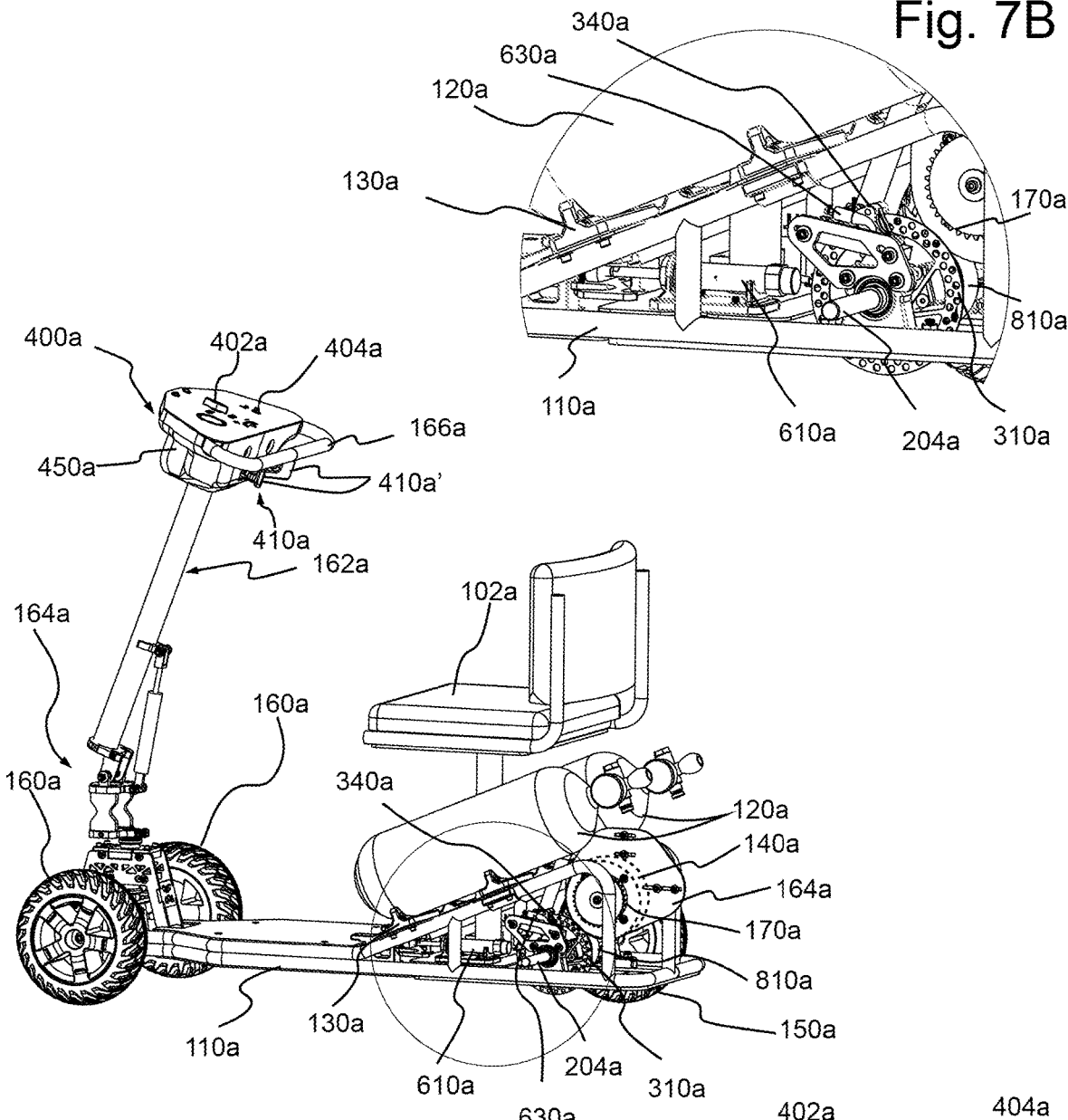
Fig. 7B
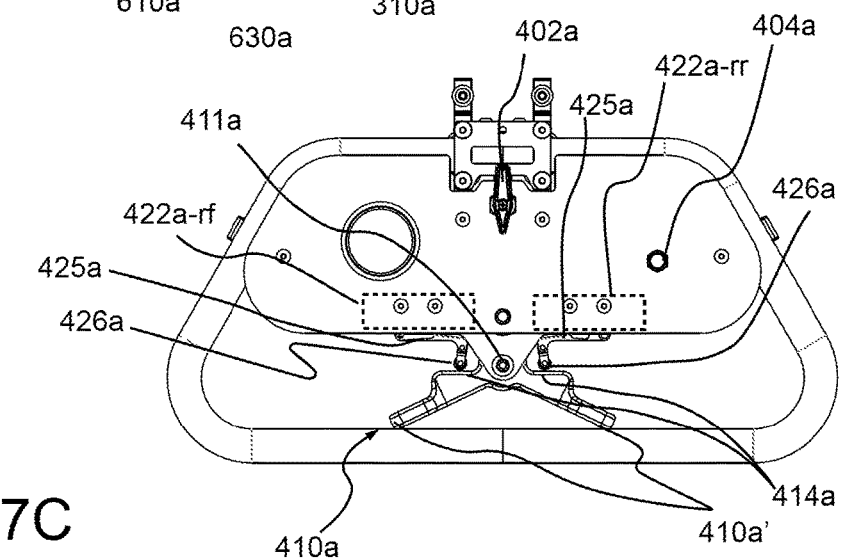
Fig. 7A
Fig. 7C

PNEUMATIC POWERED MOBILITY CONTROL SYSTEMS

CROSS-REFERENCE TO RELATED APPLICATIONS

This application is a national phase filing of PCT International Patent Application No. PCT/US2019/015846, filed Jan. 30, 2019, which claims benefit of U.S. Provisional Patent Application Ser. No. 62/624,162, filed Jan. 31, 2018, the disclosures of which are incorporated herein by reference.

GOVERNMENTAL INTEREST

This invention was made with government support under grant no. DGE1144584 awarded by the National Science Foundation. The government has certain rights in this invention.

BACKGROUND

The following information is provided to assist the reader in understanding technologies disclosed below and the environment in which such technologies may typically be used. The terms used herein are not intended to be limited to any particularly narrow interpretation unless clearly stated otherwise in this document. References set forth herein may facilitate understanding of the technologies or the background thereof. The disclosure of all references cited herein are incorporated by reference.

Personal mobility devices such as wheelchairs and scooters are very beneficial to people with mobility impairments. As used herein, the term "mobility device" refers to a device to transport a person (typically a single person), thereby increasing the mobility of the person. Mobility devices may be manually powered or at least partially powered via a non-manual power source. Currently available power mobility devices (PMD) tend to be inefficient, heavy, maintenance intensive, environmentally sensitive, environmentally disruptive, and difficult to transport (for example, in a motor-vehicle or on an airplane). Electric powered PMD rely on batteries (mostly lead-acid) that can be hazardous and are increasingly costly and difficult to recycle. Even though batteries are widely used in hybrid and electric powered cars and in PMD, battery technology remains expensive and presents many safety issues (for example, fire, electric shock, electromagnetic interference, burns from high temperature, out-gassing, and other electrical/power failure modes) for PMD usage. There is a need for new power sources, power management systems, and drive-trains for PMD.

SUMMARY

In one aspect, a personal mobility device includes a frame, a plurality of wheels attached to the frame and including a first drive wheel, and a first pneumatic motor in operative connection with the first drive wheel. The first pneumatic motor includes a first forward port and a first rearward port. The personal mobility device further includes at least one tank of pressurized gas comprising an outlet, a regulator in fluid connection with the outlet of the tank of pressurized gas which decreases pressure from a pressure of the tank of pressurized gas to a lower pressure, and a control system. The control system includes a manually operated actuator, a first forward control valve having an inlet in fluid connection with the regulator and an outlet in fluid connection with the first forward port, a first rearward control valve having an inlet in fluid connection with the regulator and an outlet in fluid connection with the first rearward port. Movement of the manually operated actuator controls actuation of the first forward control valve and the first rearward control valve and thereby flow of gas from the regulator to the first forward port and the first rearward port.

In a number of embodiments, the personal mobility device further includes a second pneumatic motor in operative connection with a second drive wheel. The second pneumatic motor includes a second forward port and a second rearward port. The control system may, for example, further include a second forward control valve having an inlet in fluid connection with the regulator and an outlet in fluid connection with the second forward port, and a second rearward control valve having an inlet in fluid connection with the regulator and an outlet in fluid connection with the second rearward port. Movement of the manually operated actuator also controls actuation of the second forward control valve and the second rearward control valve and thereby flow of gas from the regulator to the second forward port and the second rearward port. In a number of embodiments, the first pneumatic motor is a first rotary piston pneumatic motor and the second pneumatic motor is a second rotary piston pneumatic motor.

In a number of embodiments, the manually operated control system controls the first forward control valve, the first rearward control valve, the second forward control valve and the second rearward control valve to effect differential steering.

In a number of embodiments, the manually operated actuator includes a joystick or a wig wag control. The manually operated actuator may, for example, include an extending section or a lever arm extending between a portion configured to be manually grasped, contacted or touched by an operator or user and a directional control valve activator. Movement of the directional control valve actuator controls actuation of the control valves (for example, the first forward control valve, the first rearward control valve, the second forward control valve, and the second rearward control valve and thereby) flow of gas from the regulator to the ports of the pneumatic motor (for example, the first forward port, the first rearward port, the second forward port and the second rearward port) to, for example, effect differential steering.

In a number of embodiments, each of the control valves (for example, the first forward control valve, the first rearward control valve, the second forward control valve, and the second rearward control valve) includes an actuator and a follower in operative connection with the actuator. The follower of each of the control valves may, for example, be in contact with a surface of the directional control valve actuator which has a predetermined surface conformation configured to provide a predetermined output for each of the control valves as determined by manipulation of the position of the manually operated actuator configured to be manually grasped, contacted or touched by the operator.

The control system may, for example, include a main flow control valve having an inlet in fluid connection with the regulator and an outlet in fluid connection with the inlet of the control valves (for example, the inlet of the first forward control valve, the inlet of the first rearward control valve, the inlet of the second forward control valve, and the inlet of the second rearward control valve). The control system may, for example, further include an on/off valve having an inlet in fluid connection with the regulator and an outlet in fluid connection with the inlet of the main flow control valve.

In a number of embodiments, the personal mobility device further includes a braking system to resist rotation of at least one of the first drive wheel and the second drive wheel (in embodiments with a second drive wheel). The personal motility device may, for example, further include a brake system actuator to actuate the braking system including a valve in fluid connection with the regulator, and which is in fluid connection with a valve system which activates the valve of the brake system actuator. In a number of embodiments, the brake system actuator actuates the brake system when the manually operated actuator is in a predetermined resting or neutral position. The predetermined resting or neutral position may, for example, occur in the absence of manipulation of the manually operated actuator by the operator. In a number of embodiments, the brake system actuator may, for example, actuate the braking system when three of the first forward control valve, the first rearward control valve, the second forward control valve, and the second rearward control valve are in a non-activated state, wherein no pressurized gas flows therethrough to the first rotary piston motor or to the second rotary piston motor as controlled by a predetermined resting position of the manually operated actuator.

The braking system may, for example, include a first brake operatively connected to the first drive wheel and a second brake operatively connected to the second drive wheel. The first brake and the second brake may, for example, be actuated when the manually operated actuator is in the predetermined resting position.

In a number of embodiments, each of the control valves (for example, the first forward control valve, the first rearward control valve, the second forward control valve, and the second rearward control valve) includes a lever arm rotatably attached thereto. The follower is attached at an end of the lever arm. In a number of embodiments, no greater than 10N of force is required to manually manipulate the manually operated actuator. In a number of embodiments, less than 10N of force is required to manually manipulate the manually operated actuator.

The personal mobility device may, for example, further include a coupler including a first connector and a second connector which cooperates with the first connector to form a releasable connection therebetween. The first connector includes a plurality of ports wherein each of the plurality of ports is in fluid connection with only one a plurality of tubing lines in fluid connection with the manual control system, The second connector includes a plurality of ports wherein each of the plurality of ports of the second connector is configured to form a sealed connection with only one of the plurality of ports of the first connector when the second connector is connected to the first connector. One of the plurality of ports may, for example, be in fluid connection with the outlet of the first forward control valve, one of the plurality of ports of the first connector may be in fluid connection with the outlet of the first rearward control valve, one of the plurality of ports may be in fluid connection with the outlet of the second forward control valve, and one of the plurality of ports of the first connector may be in fluid connection with the outlet of the second rearward control valve.

In a number of embodiments, the manually operated control system includes a housing in which the control valves (for example, the first forward control valve, the first rearward control valve, the second forward control valve, and the second rearward control valve) are positioned. Exhaust from at least one of the control valves may, for example, be used to maintain a positive pressure within the housing during period of time wherein the at least one of the first forward control valve, the control valves is activated by the manually operated actuator.

In another aspect, a personal mobility device includes a control system including a manually operated actuator and a plurality of control valves for at least one pneumatic motor, wherein movement of the manually operated actuator (by an operator/user) controls actuation of each of the plurality of control valves and thereby flow of gas from a source of pressurized gas to the pneumatic motor. In a number of embodiments, the control system includes a first forward control valve having an inlet in fluid connection with the source of pressurized gas and an outlet in fluid connection with a first forward port of the first pneumatic motor, and a first rearward control valve having an inlet in fluid connection with the source of pressurized gas and an outlet in fluid connection with a first rearward port of the first pneumatic motor. Movement of the manually operated actuator controls actuation of the first forward control valve and the first rearward control valve and thereby flow of gas from the source of pressurized gas to the first forward port and the first rearward port.

In another aspect, a method of controlling a pneumatically powered personal mobility device includes providing a control system including a manually operated actuator and a plurality of control valves having an inlet in fluid connection with a source of pressurized gas and an outlet in fluid connection with at least one pneumatic motor. Moving the manually operated actuator controls actuation of the plurality of control valves and thereby flow of gas to the pneumatic motor. In a number of embodiments, the control system includes a first forward control valve having an inlet in fluid connection with the source of pressurized gas and an outlet in fluid connection with a first forward port of a first pneumatic motor, a first rearward control valve having an inlet in fluid connection with the source of pressurized gas and an outlet in fluid connection with a first rearward port of the first pneumatic motor, a second forward control valve having an inlet in fluid connection with the source of pressurized gas and an outlet in fluid connection with a second forward port of a second pneumatic motor, and a second rearward control valve having an inlet in fluid connection with the source of pressurized gas and an outlet in fluid connection with a second rearward port of the second pneumatic motor. Moving the manually operated actuator controls actuation of the first forward control valve, the first rearward control valve, the second forward control valve, and the second rearward control valve and, thereby, flow of gas from the source of pressurized gas to the first forward port, the first rearward port, the second forward port and the second rearward port. Aspects of the personal mobility device may be further characterized as described herein.

In another aspect, a personal mobility device includes a frame and a plurality of wheels attached to the frame and including a first drive wheel. A first pneumatic motor is in operative connection with the first drive wheel. The personal mobility device further includes a source of pressurized gas. The personal mobility device further includes a control system including a manually operated control system or controller having a manually operated actuator to control flow of gas from the source of pressurized gas the first pneumatic motor and a brake system actuator to actuate the braking system. The brake system actuator includes a valve in fluid connection with the source of pressurized gas. The valve of the brake system actuator is in fluid connection with a valve system which activates the valve of the brake system actuator as controlled by a predetermined resting state of the manually operated actuator. The predetermined resting state may, for example, occur in the absence of manipulation of the manually operated actuator by the operator. In a number of embodiments, the personal mobility device includes at least one tank of pressurized gas including an outlet and a regulator in fluid connection with the outlet of the tank of pressurized gas. The regulator decreases pressure from a pressure of the tank of pressurized gas to a lower pressure.

In another aspect, a method of controlling a pneumatically powered personal mobility device includes providing a control system including a manually operated actuator to control flow of gas from a source of pressurized gas to a pneumatic motor and a brake system actuator to actuate a braking system. The brake system actuator includes a valve in fluid connection with the source of pressurized gas. The method may further include providing a valve system in fluid connection with the valve of the brake system actuator to activate the valve of the brake system actuator as controlled by a predetermined resting state of the manually operated actuator. As set forth above, the predetermined resting state may, for example, occur in the absence of manipulation of the manually operated actuator by the operator.

In another aspect, a personal mobility device includes a frame and a plurality of wheels attached to the frame and include a first drive wheel on a first side of the frame and a second drive wheel on a second side of the frame. The personal mobility device further includes a first pneumatic motor in operative connection with the first drive wheel and a second pneumatic motor in operative connection with the second drive wheel. The first pneumatic motor includes a first forward port and a first rearward port, and the second pneumatic motor includes a second forward port and a second rearward port. The personal mobility device further includes a source of pressurized gas. The personal mobility device further includes a manually operated actuator and a plurality of control valves in operative connection with the manually operated actuator. In a number of embodiments, the plurality of control valves controls flow of gas from the source of pressurized gas to the first pneumatic motor and to the second pneumatic motor in a manner to effect differential steering. In a number of embodiments, the personal mobility device includes at least one tank of pressurized gas having an outlet and a regulator in fluid connection with the outlet of the tank of pressurized gas. The regulator decreases pressure from a pressure of the tank of pressurized gas to a lower pressure.

In another aspect, a method of controlling a pneumatically powered personal mobility device includes providing a control system including a manually operated actuator and a plurality of control valves in operative connection with the manually operated actuator. In a number of embodiments, the plurality of control valves controls flow of gas from a source of pressurized gas to a first pneumatic motor powering a first drive wheel on a first side of the personal mobility device and to a second pneumatic motor powering a second drive wheel on a second side of the personal mobility device in a manner to effect differential steering.

In another aspect, a personal mobility device includes a control system including a manually operated actuator having a control valve actuator attached thereto. The personal mobility device further includes a plurality of control valves for controlling flow of pressurized gas to at least one pneumatic motor. Each of the plurality of control valves is in operative connection with the manually operated actuator. Each of the plurality of control valves includes an actuator and a follower in operative connection with the actuator. The follower of each of the control valves is in contact with a surface of the control valve actuator which has a predetermined surface conformation configured to provide a predetermined output for each of the plurality of control valves as determined by manipulation of the position of the portion of the joystick configured to be manually grasped by the operator. In a number of embodiments, at least one of the plurality of control valves controls flow of pressurized gas from a source of pressurized gas to a first pneumatic motor, and at least one other of the plurality of control valves controls flow of pressurized gas from the source of pressurized gas to a second pneumatic motor. The personal mobility device may, for example, include a frame and a plurality of wheels attached to the frame and include a first drive wheel on a first side of the frame and a second drive wheel on a second side of the frame. A first pneumatic motor may, for example, be in operative connection with the first drive wheel. The first pneumatic motor may, for example, include a first forward port and a first rearward port. A second pneumatic motor may, for example, be in operative connection with the second drive wheel. The second pneumatic motor may, for example, include a second forward port and a second rearward port. In a number of embodiments, the personal mobility device further includes at least one tank of pressurized gas including an outlet and a regulator in fluid connection with the outlet of the tank of pressurized gas. The regulator decreases pressure from a pressure of the tank of pressurized gas to a lower pressure. At least one of the control valves may, for example, be in fluid connection with one of the first forward port and the first rearward port to control flow a pressurized gas thereto. At least one other of the control valves may, for example, be in fluid connection with one of the second forward port and the second rearward port to control flow a pressurized gas thereto.

In another aspect, a method of controlling a pneumatically powered personal mobility device includes providing a control system including a manually operated actuator having a control valve actuator attached thereto. Each of a plurality of control valves is in operative connection with the manually operated actuator. Each of the plurality of control valves includes an actuator and a follower in operative connection with the actuator. The follower of each of control valves is in contact with a surface of the control valve actuator which has a predetermined surface conformation configured to provide a predetermined output for each of the plurality of control valves as determined by manipulation of the position of the portion of the joystick configured to be manually grasped by the operator.

In another aspect, a personal mobility device includes a frame and a plurality of wheels attached to the frame and including a first drive wheel. A first pneumatic motor is in operative connection with the first drive wheel. The personal mobility device further includes a source of pressurized gas. The personal mobility device further includes a control system including a manually operated control system including a manually operated actuator to control flow of gas from the source of pressurized gas to the first pneumatic motor via at least one control valve enclosed within a housing. Exhaust from the control valve maintains an interior of the under positive pressure for at least a period of time. In a number of embodiments, the personal mobility device includes at least one tank of pressurized gas including an outlet and a regulator in fluid connection with the outlet of the tank of pressurized gas. The regulator decreases pressure from a pressure of the tank of pressurized gas to a lower pressure.

In another aspect, a method of controlling a pneumatically powered personal mobility device includes providing a control system including a manually operated control system or controller including a manually operated actuator to control flow of gas from a source of pressurized to at least one pneumatic motor via at least one control valve enclosed within a housing. Exhaust from the control valve maintains an interior of the under positive pressure for at least a period of time.

In another aspect, a personal mobility device includes a frame and a plurality of wheels attached to the frame and including a first drive wheel. A first pneumatic motor is in operative connection with the first drive wheel. The personal mobility device further includes a source of pressurized gas. The personal mobility device further includes a control system including a manually operated actuator to control flow of gas from the source of pressurized gas to the first pneumatic motor via at least one control valve including a lever arm rotatably attached thereto in operable connection with an actuator of the at least one control valve, which controls flow of pressurized gas through the at least one control valve. A follower is attached at an end of the lever arm. The follower is in contact with an actuator member attached to an end of an extending member of the manually operated actuator. In a number of embodiments, no greater than 10N of force is required to manually manipulate the joystick. In a number of embodiments, the personal mobility device includes least one tank of pressurized gas including an outlet and a regulator in fluid connection with the outlet of the tank of pressurized gas. The regulator decreases pressure from a pressure of the tank of pressurized gas to a lower pressure.

In another aspect, a method of controlling a pneumatically powered personal mobility device includes providing a control system including a manually operated control system or controller which includes a manually operated actuator to control flow of gas from a source of pressurized gas to at least one pneumatic motor via at least one control valve including a lever arm rotatably attached thereto in operable connection with an actuator of the at least one control valve, which controls flow through the at least one control valve. A follower is attached at an end of the lever arm. The follower is in contact with an actuator member attached to an end of an extending member of the manually operated actuator. In a number of embodiments, no greater than 10N of force is required to manually manipulate the joystick.

In a further aspect, a personal mobility device includes a frame and a plurality of wheels attached to the frame and including a first drive wheel. The personal mobility device further includes a first pneumatic motor in operative connection with the first drive wheel and a source of pressurized gas. The personal mobility device further includes a control system including a manually operated actuator and a plurality of control valves in operative connection with the manually operated actuator. The plurality of control valves control flow of (pressurized) gas from the source of pressurized gas to the first pneumatic motor. The personal mobility device further includes a coupler including a first connector and a second connector which cooperates with the first connector to form a releasable connection therebetween. The first connector includes a plurality of ports wherein each of the plurality of ports is in fluid connection with only one a plurality of tubing lines in fluid connection with the control system. The second connector includes a plurality of ports. Each of the plurality of ports of the second connector is configured to form a sealed connection with only one of the plurality of ports of the first connector when the second connector is connected to the first connector. In a number of embodiments, the personal mobility device includes at least one tank of pressurized gas including an outlet, and a regulator in fluid connection with the outlet of the tank of pressurized gas. The regulator decreases pressure from a pressure of the tank of pressurized gas to a lower pressure.

In still a further aspect, a method of controlling a pneumatically powered personal mobility device includes providing a control system including a manually operated actuator and a plurality of control valves in operative connection with the manually operated actuator. The plurality of control valves control flow of gas from a source of pressurized gas to at least one pneumatic motor. The method further includes providing a coupler including a first connector and a second connector which cooperates with the first connector to form a releasable connection therebetween. The first connector includes a plurality of ports wherein each of the plurality of ports is in fluid connection with only one a plurality of tubing lines in fluid connection with the control system. The second connector includes a plurality of ports. Each of the plurality of ports of the second connector is configured to form a sealed connection with only one of the plurality of ports of the first connector when the second connector is connected to the first connector.

In a further aspect, a control system for a pneumatic system includes a manually operated actuator, a first control valve having an inlet in fluid connection with a source of pressurized gas and an outlet in fluid connection with a first pneumatic component of the pneumatic system, and at least a second control valve having an inlet in fluid connection with the source of pressurized gas and an outlet in fluid connection with a second pneumatic component of the pneumatic system, wherein movement of the manually operated actuator controls actuation of the first control valve, and the second control valve and thereby flow of gas from the source of pressurized gas to the first pneumatic component and to the second pneumatic component. The control system may be further characterized as described above.

The manually operated actuator may, for example, include an extending member of a lever arm extending between a portion configured to be manually contacted by an operator and a directional control valve activator, wherein movement of the directional control valve actuator controls actuation of the first control valve and the second control valve. In a number of embodiments, each of the first control valve and the second control valve includes a flow actuator and a follower in operative connection with the flow actuator. The follower of each of the first control valve and the second control valve are in contact with a surface of the directional control valve actuator which has a predetermined surface conformation configured to provide a predetermined output for each of the first control valve and the second control valve as determined by manipulation of the portion of the manually operated actuator configured to be contacted by the operator. In a number of embodiments, each of the first control valve and the second control valve includes a lever arm rotatably or pivotably attached thereto. The follower may, for example, be attached at an end of the lever arm. In a number of embodiments, no greater than 10N of force is required to manually manipulate the manually operated actuator The present devices, systems, and methods, along with the attributes and attendant advantages thereof, will best be appreciated and understood in view of the following detailed description taken in conjunction with the accompanying drawings.

BRIEF DESCRIPTION OF THE DRAWINGS

FIG. 3A illustrates a perspective view of an embodiment of an axle assembly hereof.

FIG. 3B illustrates a perspective exploded view of the axle assembly of FIG. 3A.

FIG. 3C illustrates another perspective view of the axle assembly of FIG. 3A.

FIG. 5E illustrates a perspective, hidden line view of a base section of a housing of the manually operated control system of FIG. 5A.

FIG. 5F illustrates a perspective view of a base section of a housing of the manually operated control system of FIG. 5A.

FIG. 5G illustrates a top, hidden line view of a base section of a housing of the manually operated control system of FIG. 5A.

FIG. 5H illustrates another perspective view of the manually operated control system of FIG. 5A.

FIG. 7A illustrates a perspective view of an embodiment of a pneumatically powered and pneumatically controlled mobility device hereof in the form of a four-wheel scooter wherein a left-side, rear wheel has been removed.

FIG. 7B illustrates an enlarge perspective view of the encircled portion of the mobility device of FIG. 7A.

FIG. 7C illustrates an enlarged top view of a manually actuated controller and control system of the mobility device of FIG. 7A removed from connection with the remainder of the mobility device.

DESCRIPTION

Figure 1A:
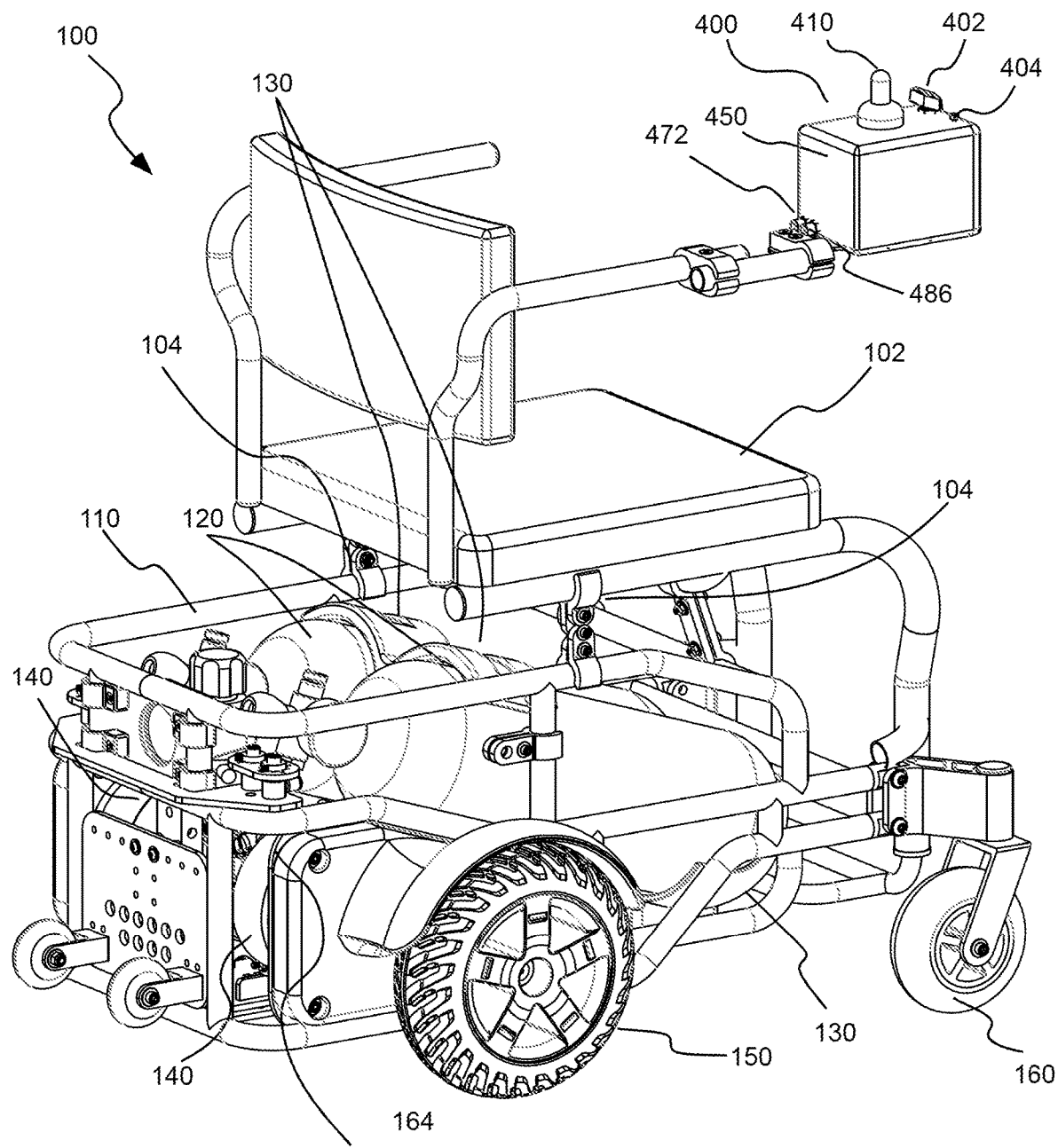
FIG. 1A illustrates a perspective view of an embodiment of a pneumatically powered and pneumatically controlled mobility device hereof.
Figure 1B:
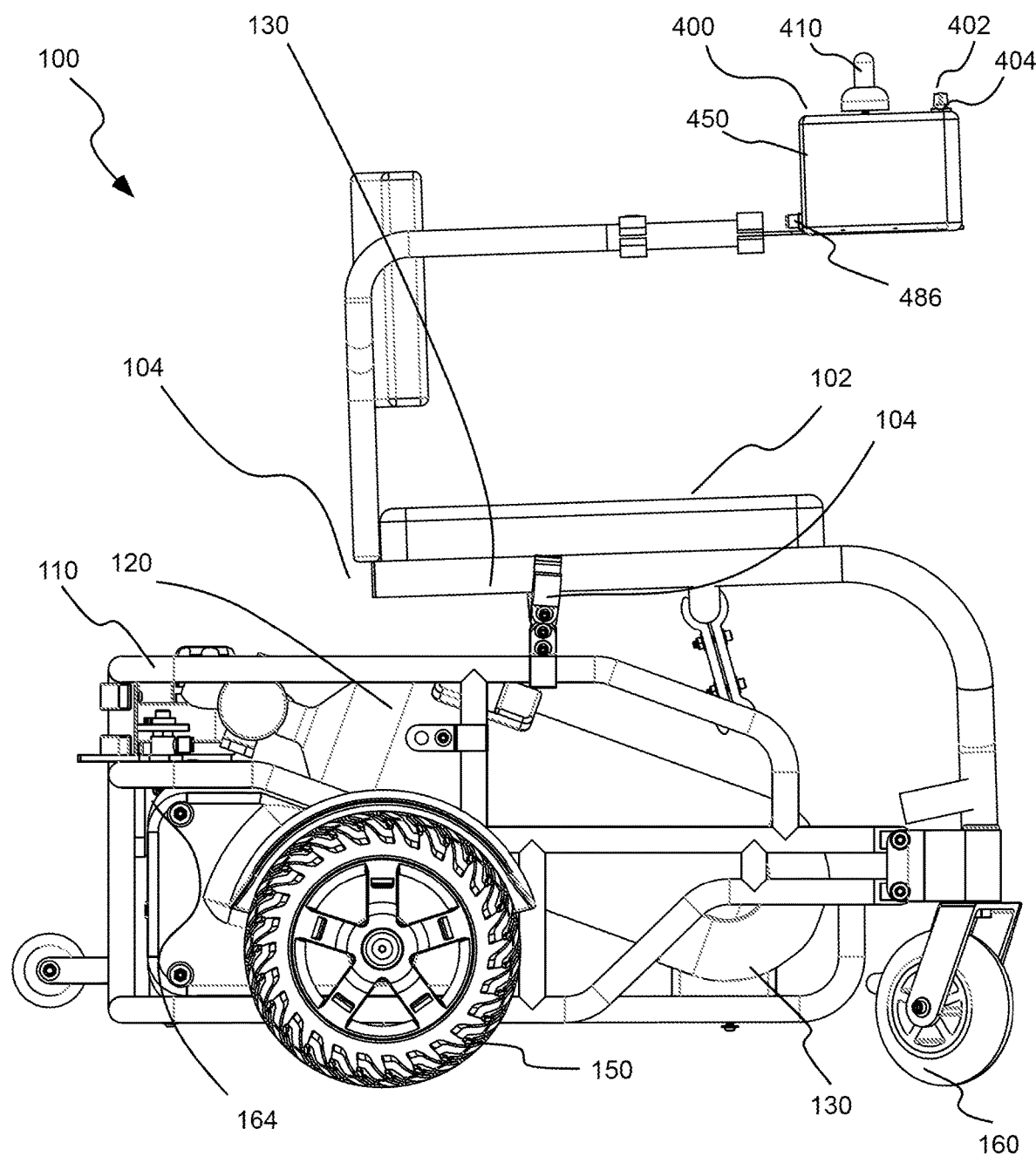
FIG. 1B illustrates a side view of the mobility device of FIG. 1A.
Figure 1C:
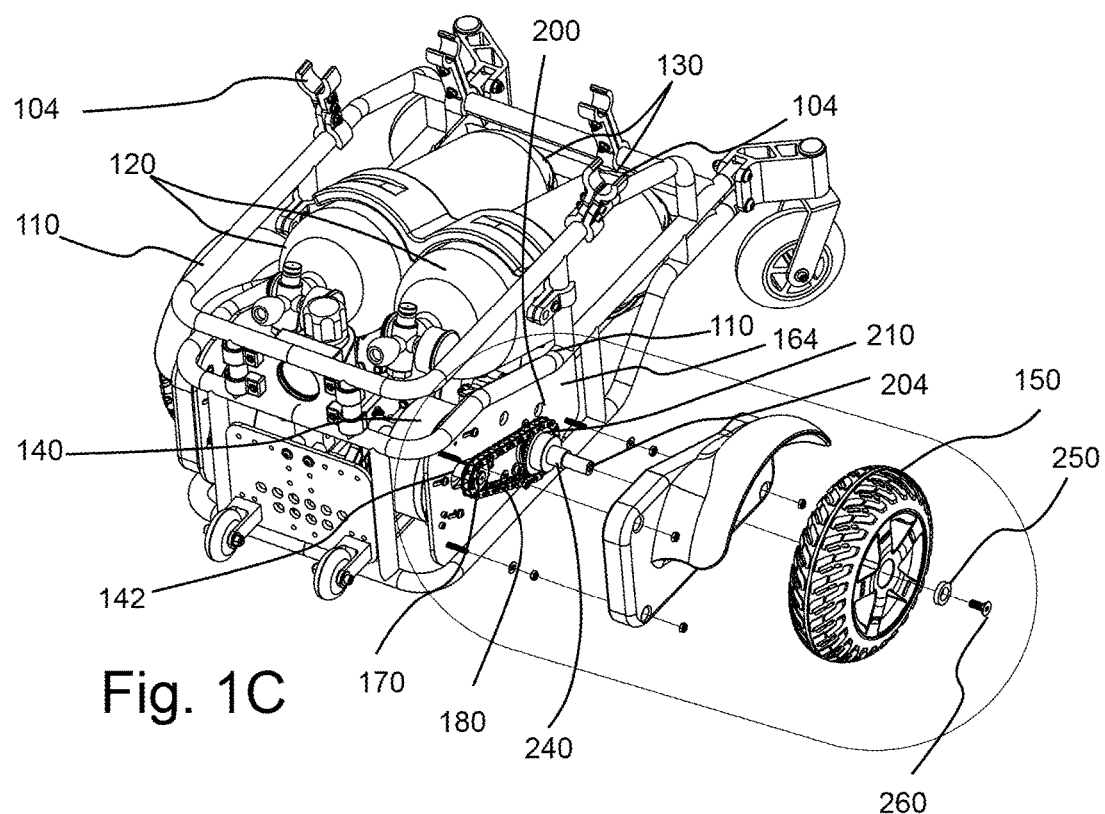
FIG. 1C illustrates a top perspective view of the mobility device of FIG. 1A with the seat removed.
Figure 1D:
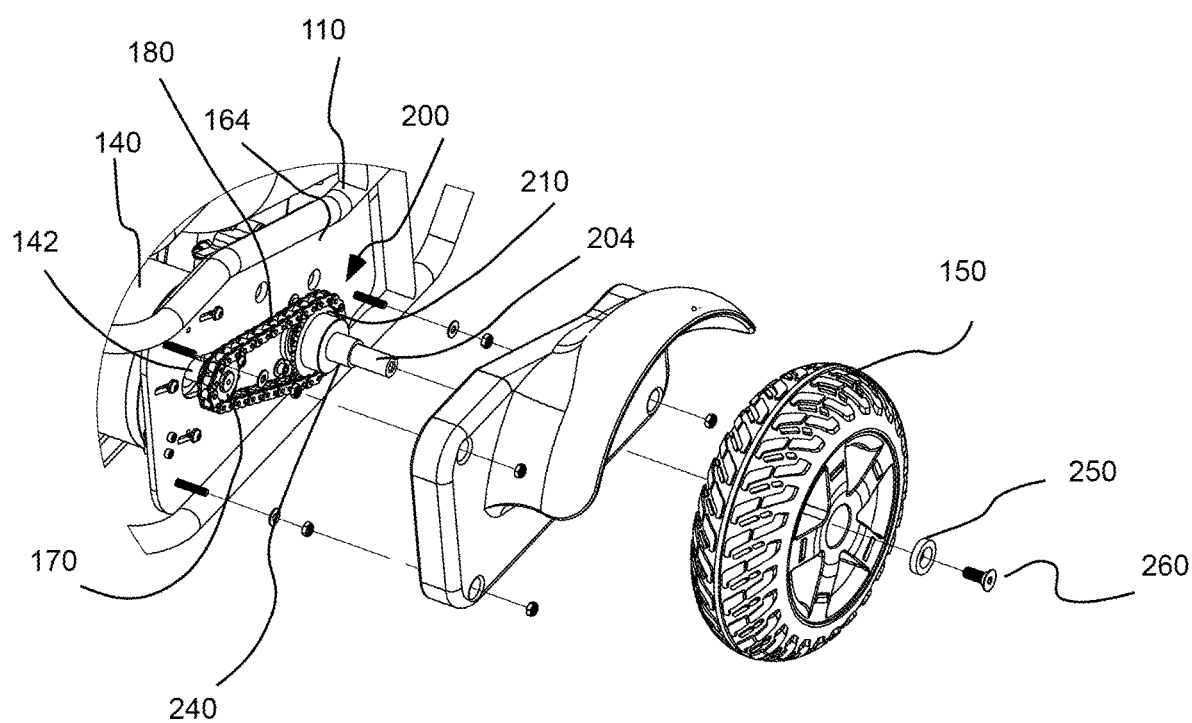
FIG. 1D illustrates an enlarged top perspective view of the indicated portion of FIG. 1C.
Figure 1E:
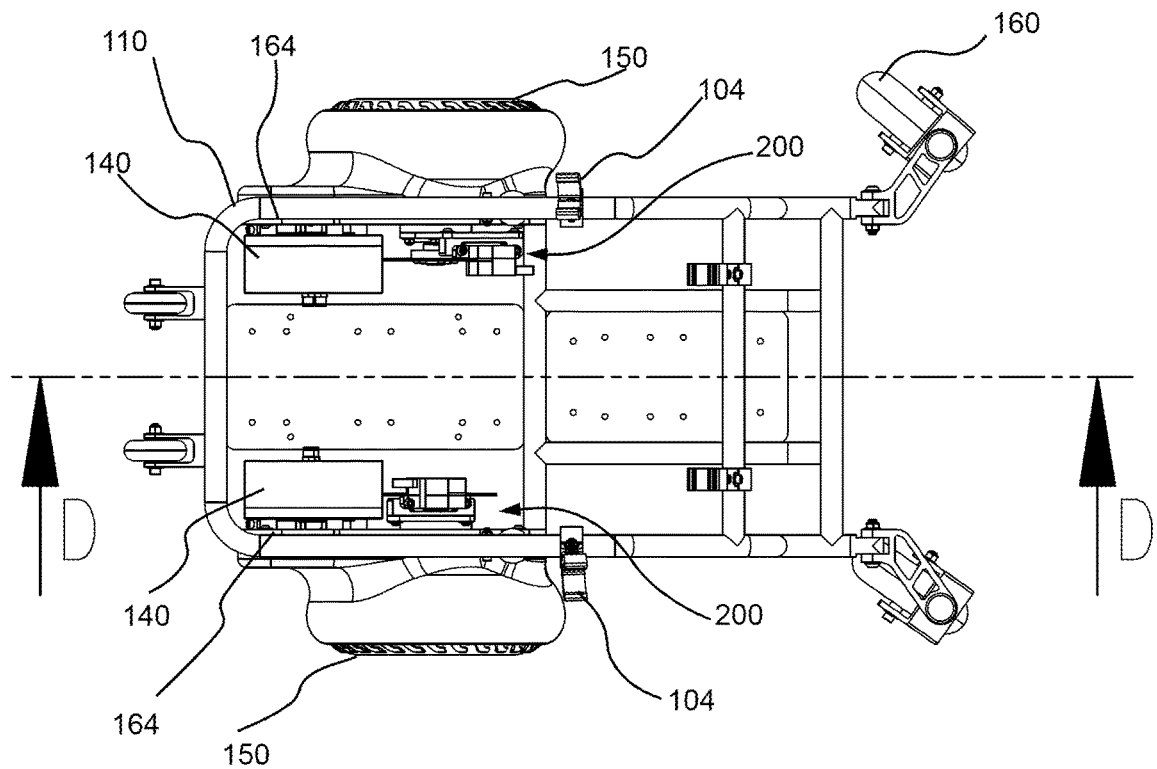
FIG. 1E illustrates a top view of a portion of the mobility device of FIG. 1A with the seat removed.
Figure 1F:
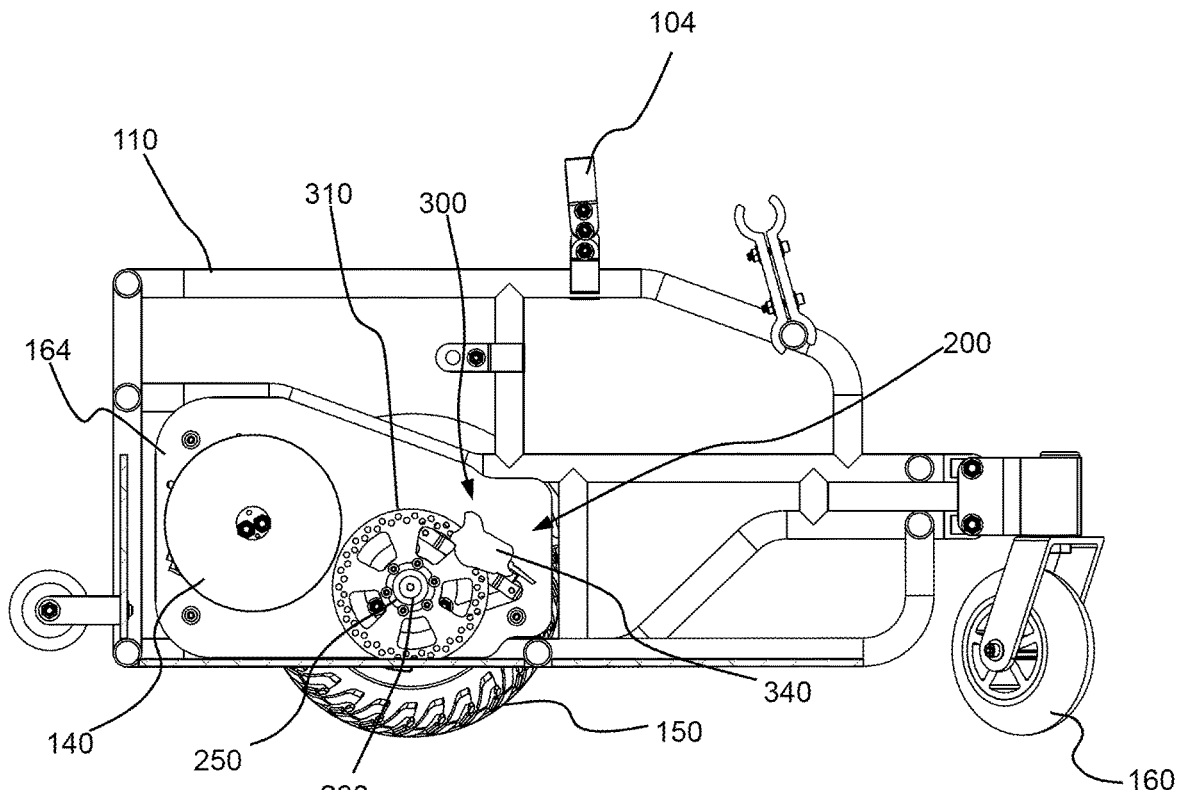
FIG. 1F illustrates a side view of the mobility device of FIG. 1A with the seat, the right drive wheel and a fender section removed.
Figure 1G:
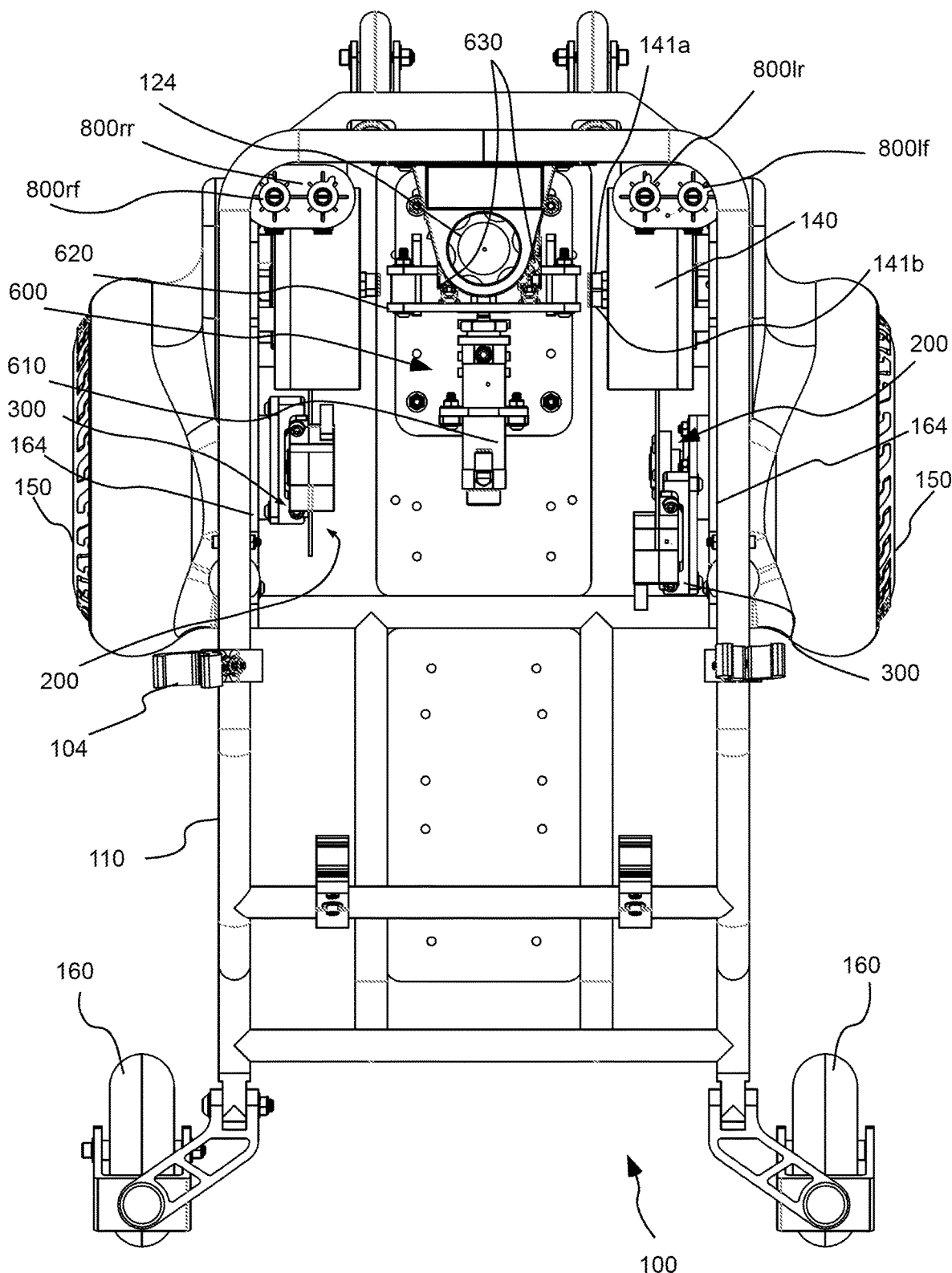
FIG. 1G illustrates another top view of a portion of the mobility device of FIG. 1A with the seat removed.
Figure 1H:
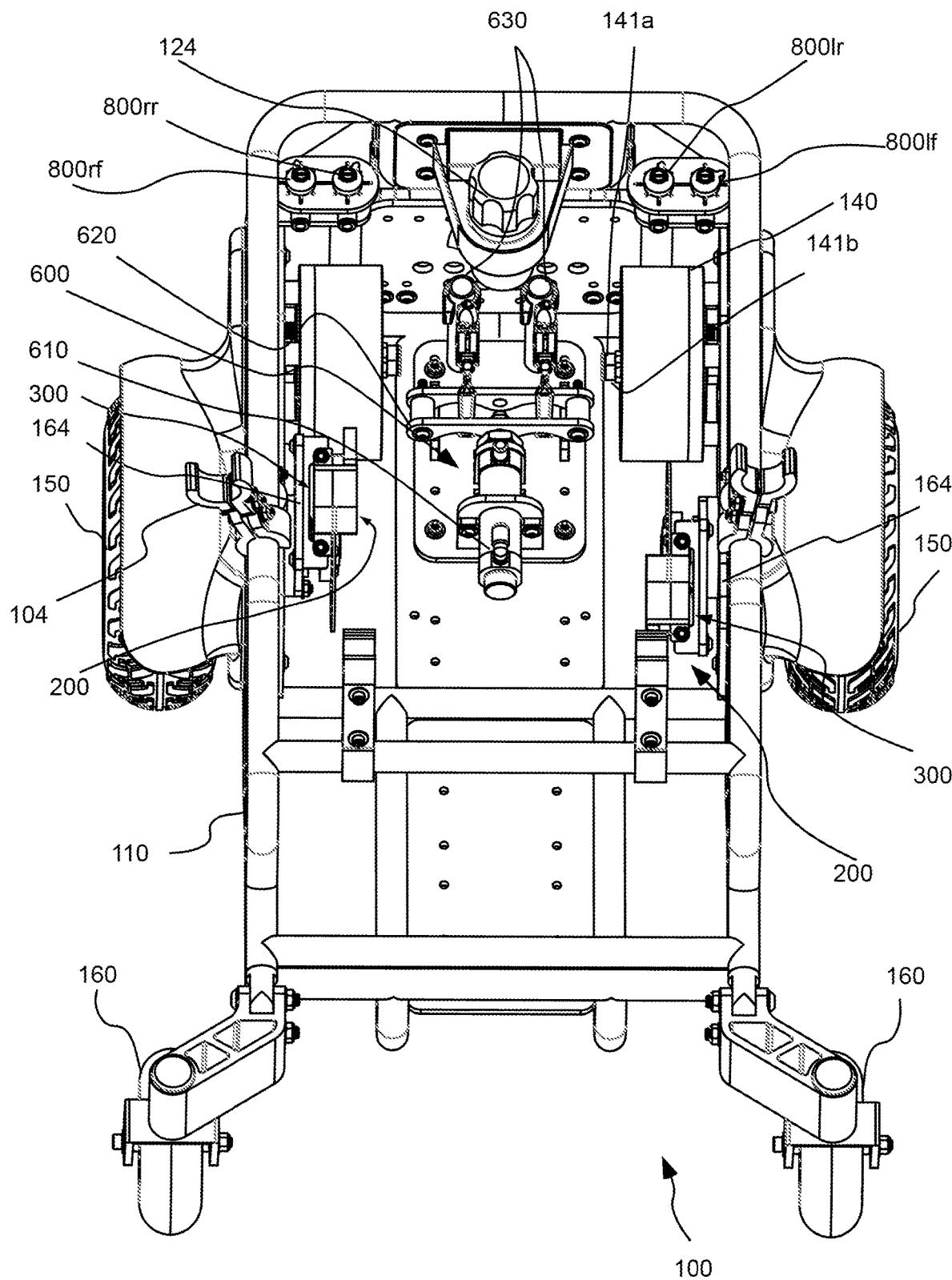
FIG. 1H illustrates another top perspective view of a portion of the mobility device of FIG. 1A with the seat removed.
Figure 1I:
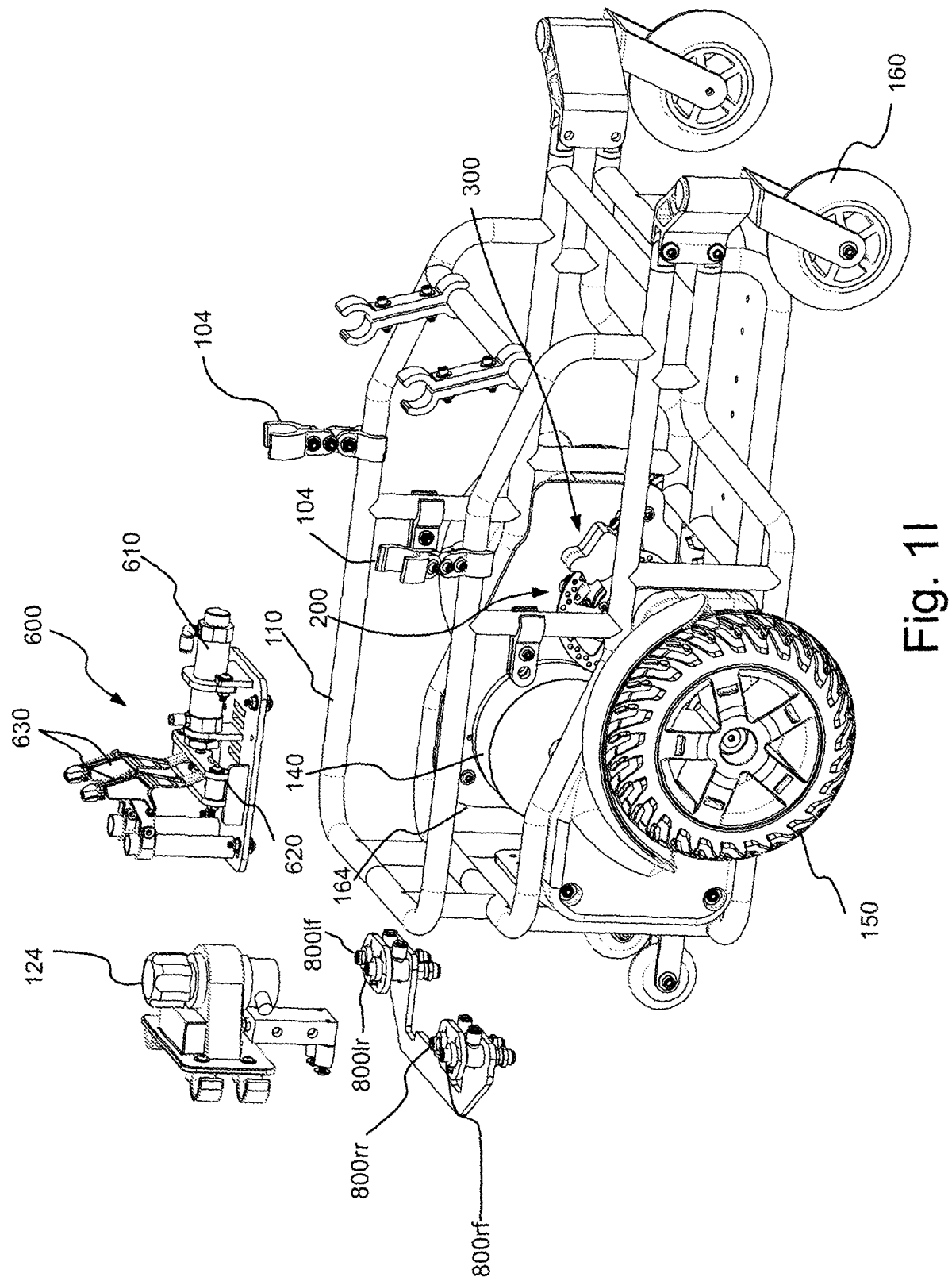
FIG. 1I illustrates a perspective, exploded view of a portion of the mobility device of FIG. 1A with the seat removed.
Figure 1J:
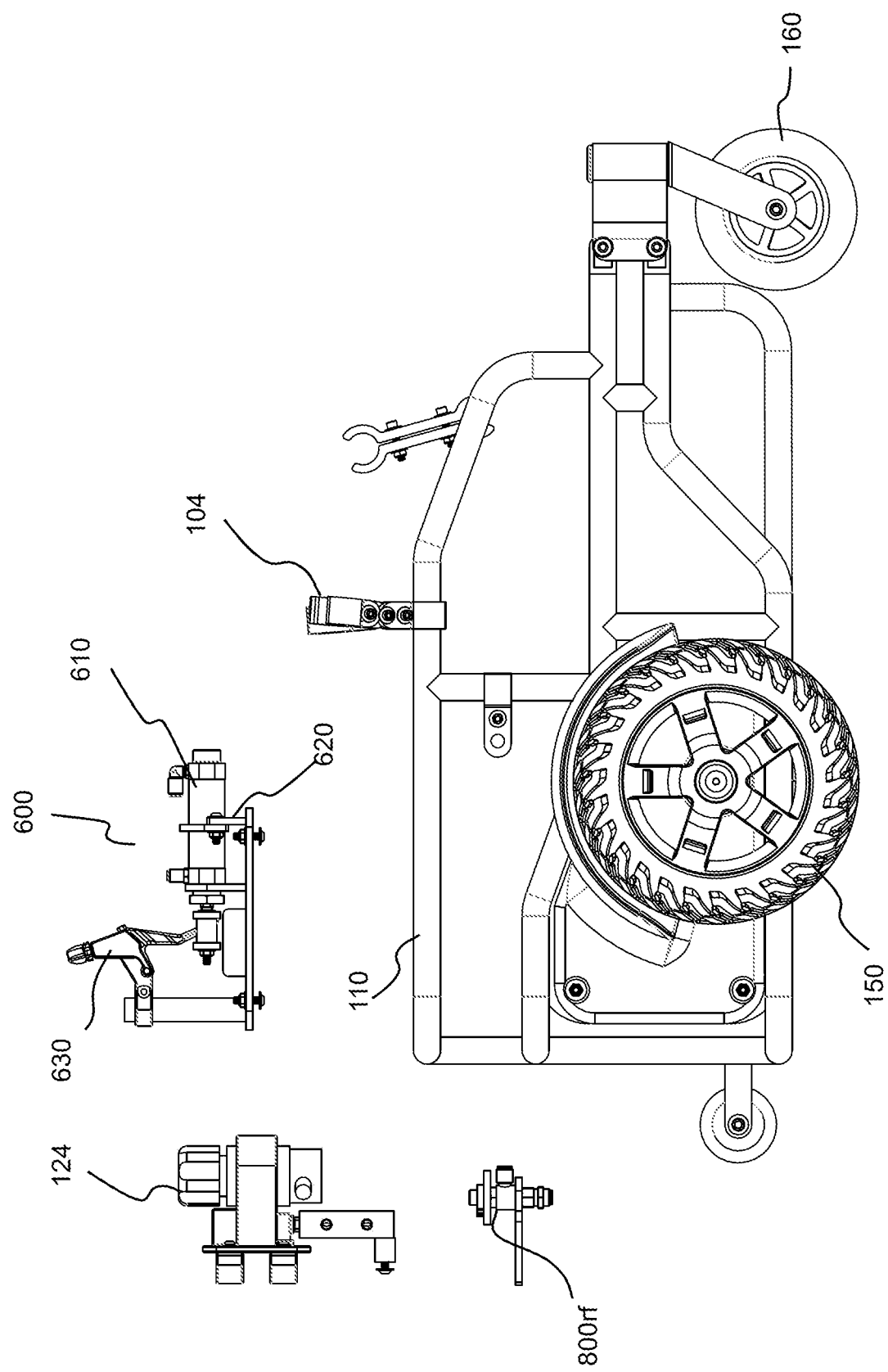
FIG. 1J illustrates a side, exploded view of a portion of the mobility device of FIG. 1A with the seat removed.

The present devices, systems, and methods, along with the attributes and attendant advantages thereof, will best be appreciated and understood in view of the following description taken in conjunction with any accompanying drawings.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As used herein and in the appended claims, the singular forms "a," "an", and "the" include plural references unless the context clearly dictates otherwise. Thus, for example, reference to "a pneumatic motor" includes a plurality of such pneumatic motors and equivalents thereof known to those skilled in the art, and so forth, and reference to "the pneumatic motor" is a reference to one or more such pneumatic motors and equivalents thereof known to those skilled in the art, and so forth. Recitation of ranges of values herein are merely intended to serve as a shorthand method of referring individually to each separate value falling within the range. Unless otherwise indicated herein, each separate value as well as intermediate ranges are incorporated into the specification as if it were individually recited herein. All methods described herein can be performed in any suitable order unless otherwise indicated herein or otherwise clearly contraindicated by the text.

Most PMD users, both community dwelling and institutional living, typically travel short distances over the course of a day, and much of that travel is indoors. Because PMD users often do not travel far and could have access to recharging stations (e.g., home, work, school, clinic, retail outlet) with most of their mobility being indoors; energy density of a power source for the PMD is less of an issue with PMD than with cars or other vehicles. In a number of embodiments, PMDs hereof include a high-pressure, pneumatic powered drive systems. As used herein, the term "pneumatic" refers to a system operated by air or other gas under pressure. For example, relatively low-cost, but efficient rotary piston air motors and portable high pressure pneumatic cylinders are used in a number of embodiments of PMD hereof to make pressurized gas (for example, air) a practical alternative to electric power for PMD.

As, for example, discussed in PCT International Patent Publication No. WO 2017/120184, the disclosure of which is incorporated herein by reference, pneumatic drive systems provide a number of advantages over electric/battery powered drive systems in PMD. For example, pneumatic drive systems provide for relatively quick and unlimited recharging. Further, a pneumatic drive system that includes a single or set of high-pressure air (HPA) or other high pressure fluid tanks allows the system to be recharged in 1-10 minutes, whereas electrically powered vehicles require recharging times between 5-8 hours for the batteries thereof. The short recharge time of pneumatic drive systems may allow a pneumatically powered vehicle to be used almost continuously. Moreover, there are many sources for recharging high-pressure air (or other gas) tanks, including, but not limited to, sporting goods stores, scuba diving shops, fire departments etc. Unlike rechargeable batteries, which often have a relatively short rechargeable lifetime, a high-pressure gas tank can be recharged repeatedly without degradation in performance. Current regulations require that all high-pressure gas tank be hydrotested every 5 years to ensure safety. Carbon fiber high-pressure gas tanks also have a mandated maximum life of 15 years, which is significantly longer than the expected life of a PMD.

Pneumatic drive systems significantly decrease weight as compared to electric/battery powered systems. Conventional electrical drive systems, which include batteries, an electric motor, and electronics for controls, typically result in a PMD weighing 400 pounds or more. By replacing the electrical drive system with a pneumatic drive system, the vehicle weight may be significantly reduced. Although pneumatic drive and control devices, systems and methodologies hereof are discussed in connection with embodiments of PMDs including a first rotary piston motor in connection with a first drive wheel and a second rotary piston motor in connection with a second drive wheel, the devices, systems and methodologies hereof may be used in connection with PMDs including one or more pneumatic motors and one or more drive wheels of various types. In that regard, pneumatic drive systems hereof may, for example, include one, two or more drive wheels. Moreover, the control devices, systems and methodologies hereof may be used in connection with any pneumatic or pneumatically powered device or system to, for example, control flow of pressurized gas to one or more pneumatic components (for example, pneumatically powered or pneumatically controlled components) of the pneumatic system.

FIGS. 1A through 1J illustrates an embodiment of a pneumatically driven PMD 100 including a custom designed tubular frame 110 to which a seat 102 is attached via connectors 104 such that seat 102 is removable. PMD 100 is powered by one or more pressurized gas cylinders or tanks 120 held in position by or seated within supports 130 (see, for example, FIG. 1A) attached to frame 110, which drive(s) pneumatic motors 140. Each pneumatic motor 140 is in operative connection with one of drive wheels 150. In the illustrated embodiment, forward wheels such as caster wheels 160 are attached to frame 110 forward of drive wheels 150.

In a number of embodiments, each pneumatic motor 140 was mounted to a plate 164 mounted on a rearward end of frame 110. A sprocket 170 was secured to and rotated about the end of the output or drive shaft 142 of each motor 140 (see, for example, FIG. 1D). Sprocket or gear 170 was operatively connected to a gear or sprocket 210 of an axle assembly 200 via, for example, an operative connector suitable to transfer motion such as a drive chain 180. The gear ratio used between motor 140 and axle assembly 200 may be adjusted (that is, with appropriate choice of sprockets/gears 170 and 210) over a range of ratios (for example, 1:1.2, 1:1, and 1.2:1). In a number of embodiments, the ratio was 1:1.

Figure 2:
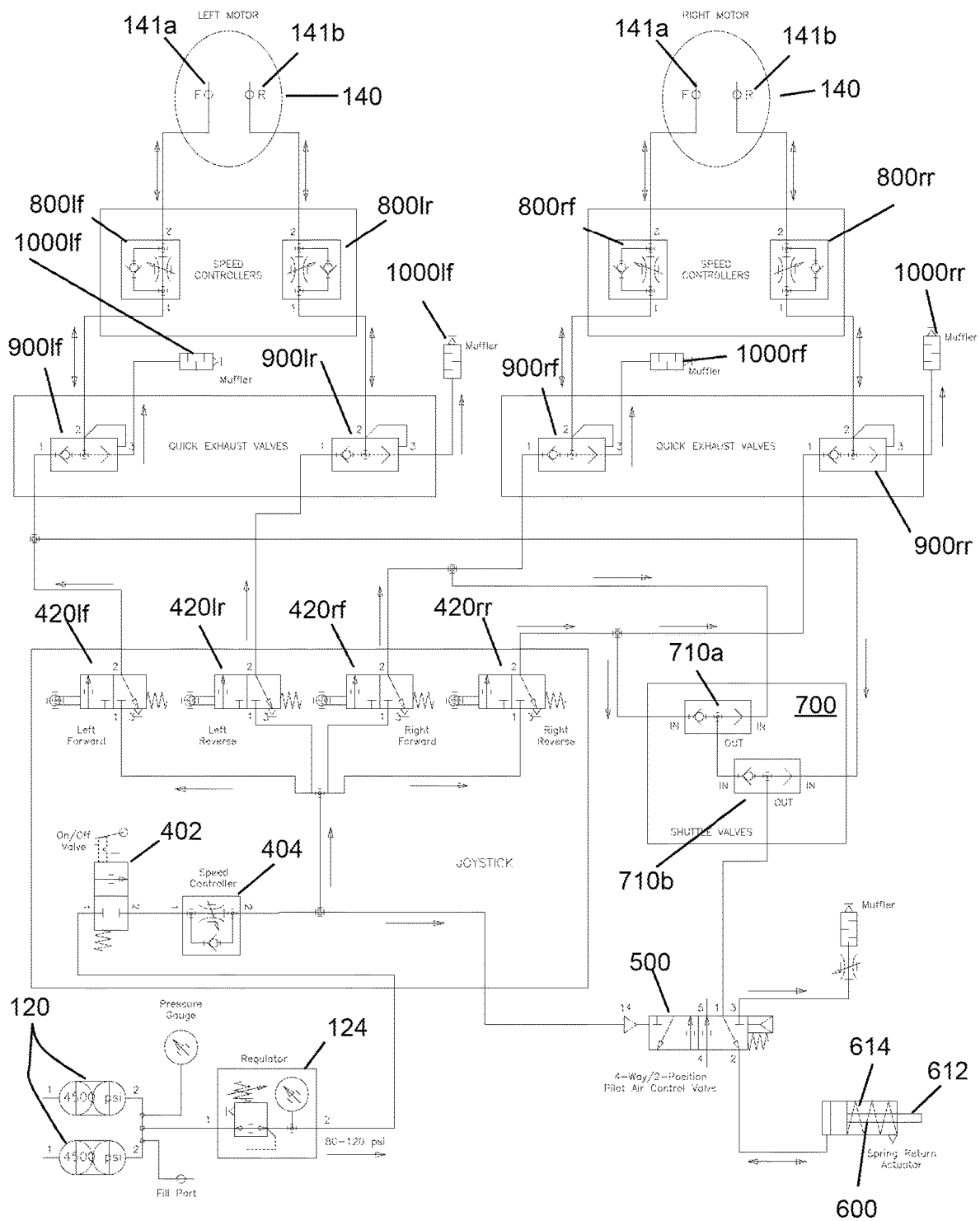
FIG. 2 illustrates a schematic view of an embodiment of the control and drive/propulsion systems of the mobility device of FIG. 1A.
Figure 3D:
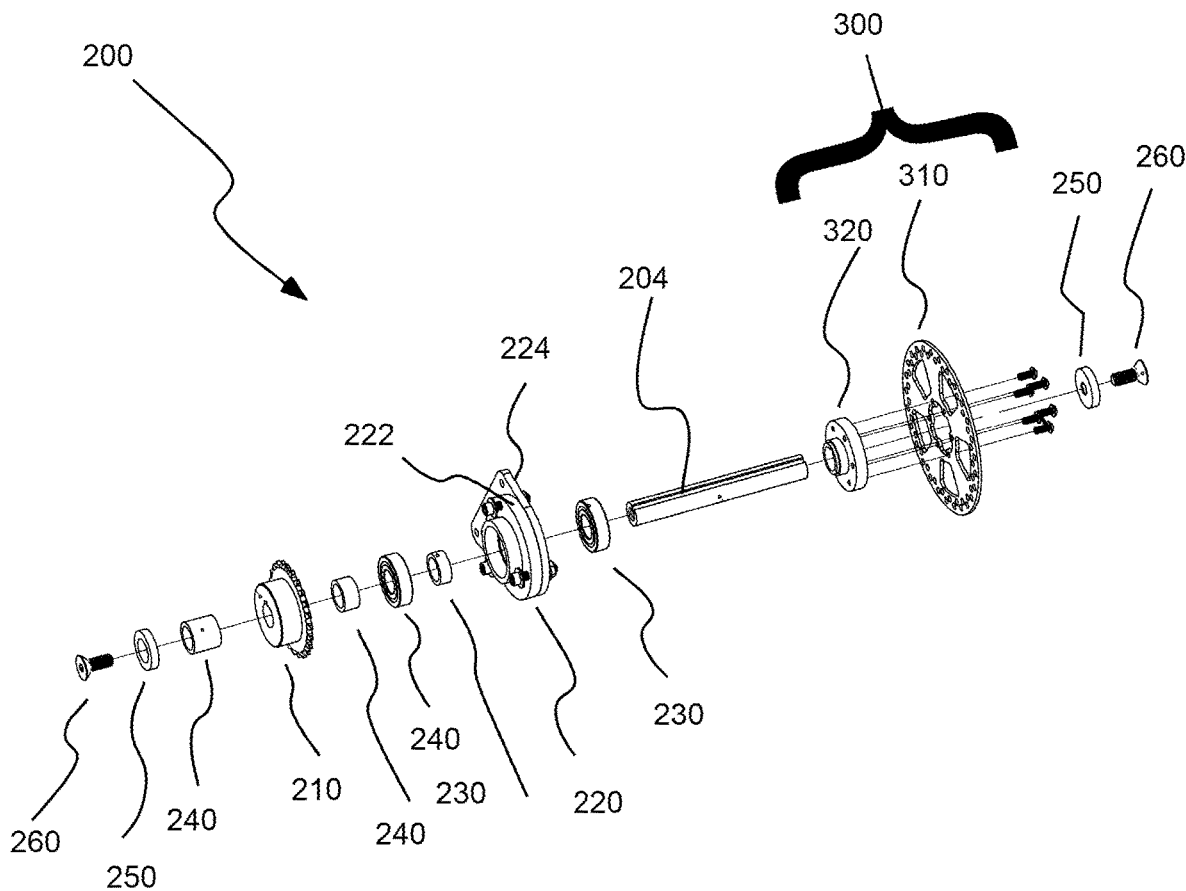
FIG. 3D illustrates a perspective exploded view of the axle assembly of FIG. 3A.
Figure 3E:
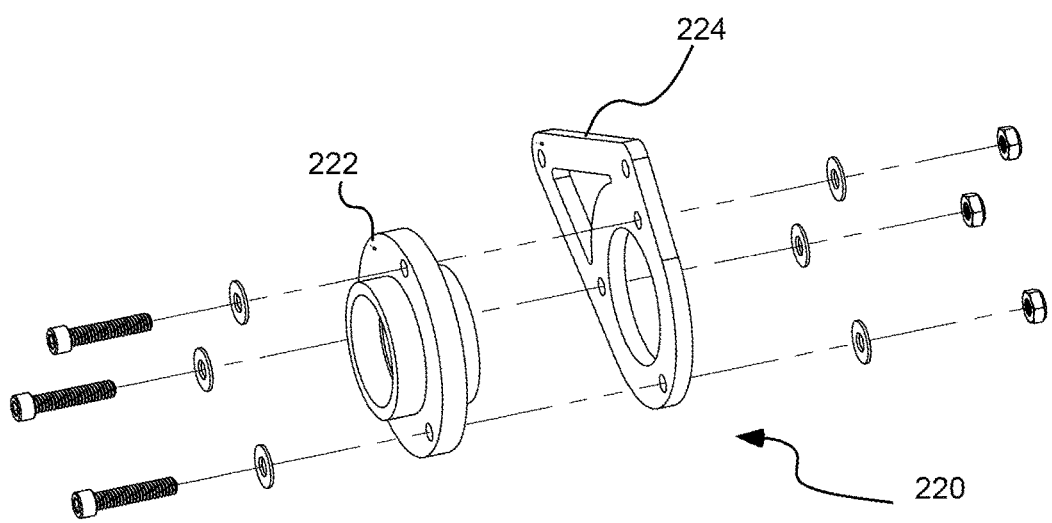
FIG. 3E illustrates a perspective exploded view of a housing body assembly of the axle assembly of FIG. 3A which includes an attachment frame for attachment of a brake caliper.
Figure 4A:
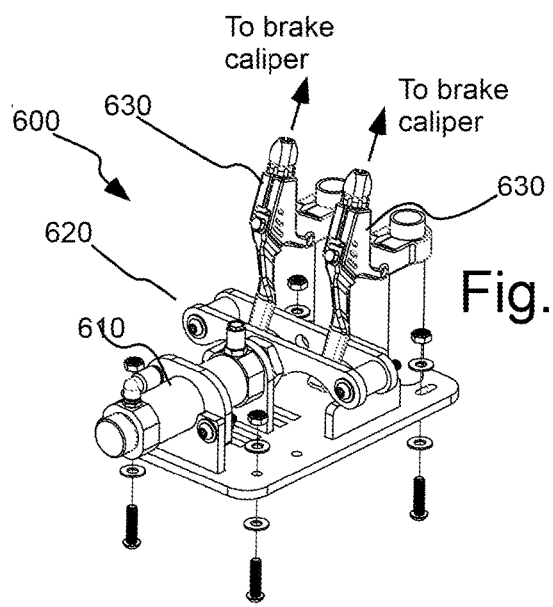
FIG. 4A illustrates a perspective view of an embodiment of a brake actuator system hereof.
Figure 4B:
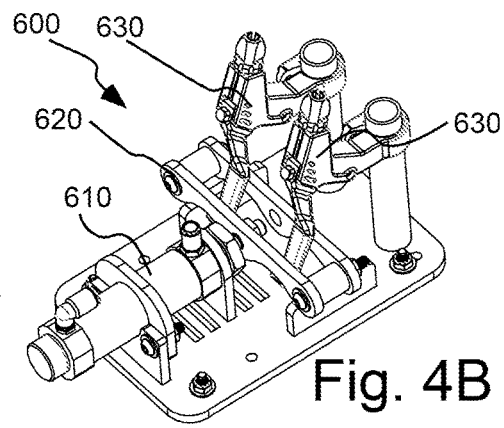
FIG. 4B illustrates another perspective view of the brake actuator system of FIG. 4A.
Figure 4C:
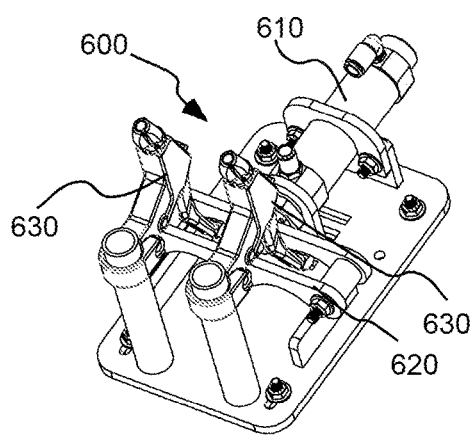
FIG. 4C illustrates another perspective view of the brake actuator system of FIG. 4A.
Figure 4D:
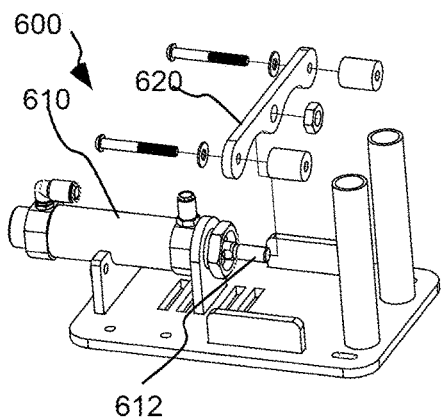
FIG. 4D illustrates a perspective exploded view of the brake actuator system of FIG. 4A.
Figure 4E:
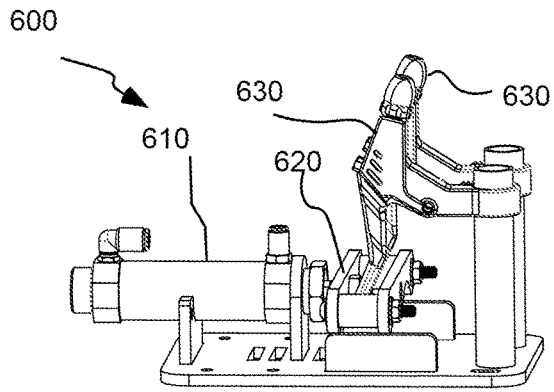
FIG. 4E illustrates another perspective view of the brake actuator system of FIG. 4A.
Figure 4F:
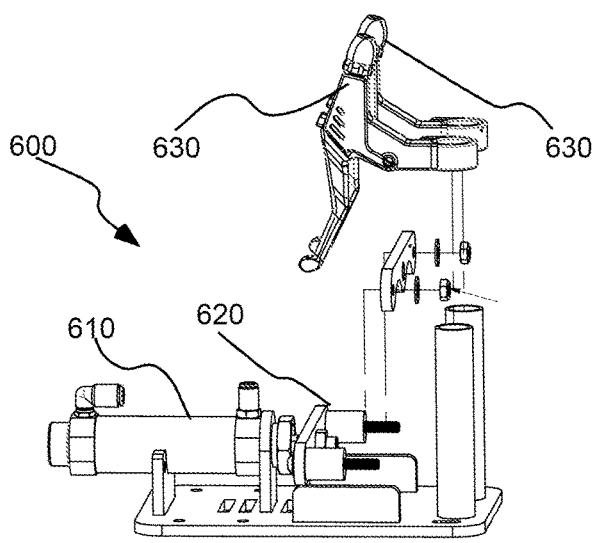
FIG. 4F illustrates another perspective exploded view of the brake actuator system of FIG. 4A.
Figure 4G:
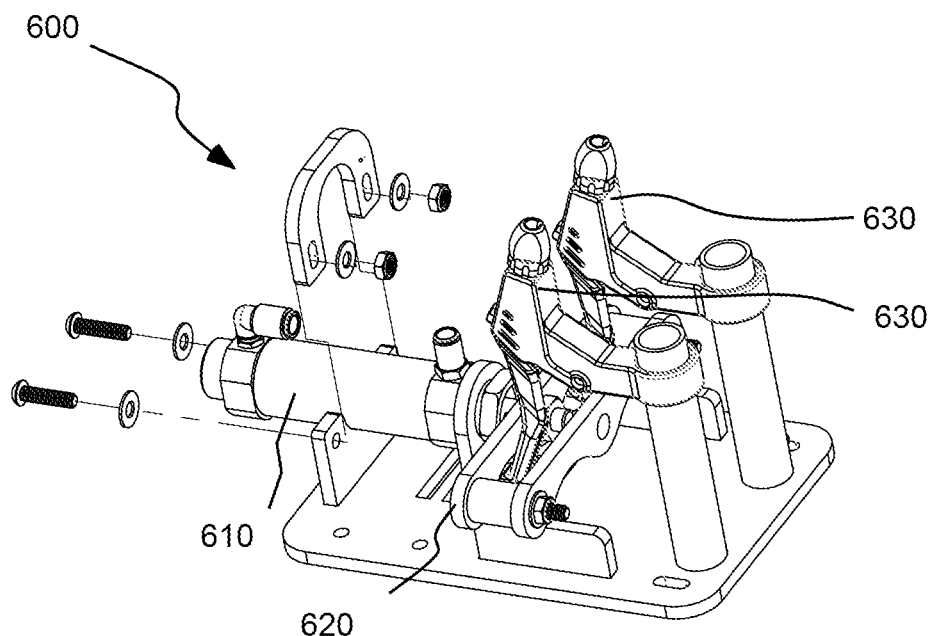
FIG. 4G illustrates another perspective exploded view of the brake actuator system of FIG. 4A.
Figure 4H:
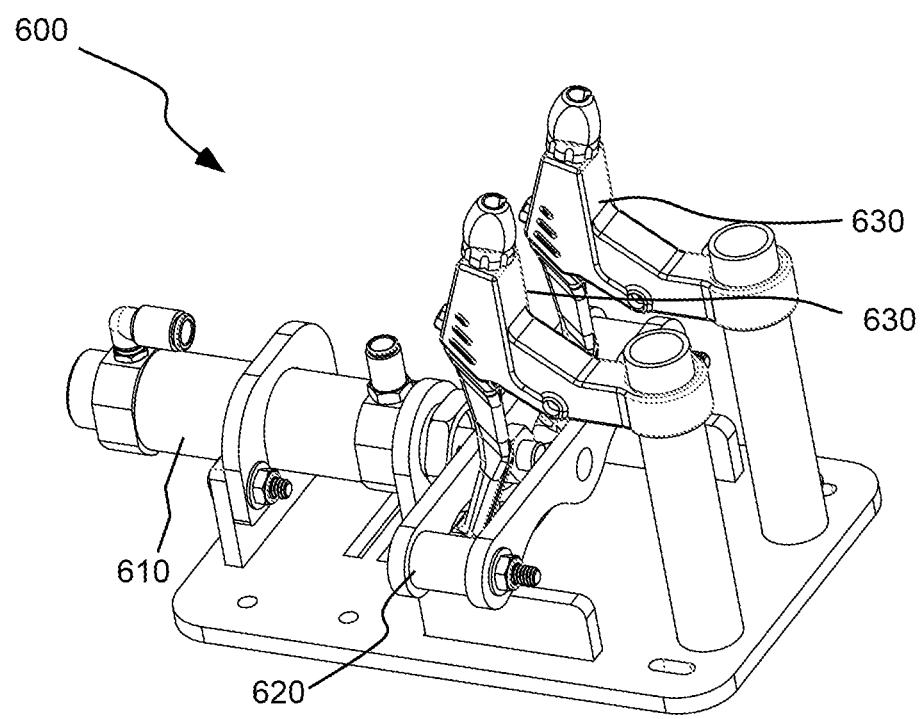
FIG. 4H illustrates another perspective view of the brake actuator system of FIG. 4A.

Hosing or tubing lines connecting the components of PMD 100 are not shown in a number of the figures but are represented schematically in FIG. 2, setting forth and embodiment of a control system and control methodology hereof. Tube diameters of line tubing used herein may vary over a range. Example of suitable tubing diameters include, for example, 6.35 mm (0.25 inch), 8.0 mm (0.315 inch) and 9.53 mm (0.375 inch). In a number of embodiments, 8.0 mm tubing was used in PMD 100.

As, for example, illustrates in FIG. 3A through 3E, in a number of embodiments, axle assembly 200 included drive wheel axle 204 upon which sprocket 210 was mounted. Axle assembly 200 also included or was operative connected to a brake system including a brake assembly 300 which, in the illustrated embodiment, was mounted upon drive wheel axle 204. Brake assembly may, for example, include a brake disk 310 (a 140 mm brake disk in several embodiments) and a drive wheel brake disk adapter 320 attached to brake disk 310 via connectors such as screws or bolts. A brake caliper bracket 330 (see, for example, FIG. 3B) may, for example, be attached to drive wheel axle housing 220 as illustrated, for example, in FIG. 3D. In that regard, axle housing 220 includes a main body 222 and an attachment frame 224 attached to main body 222. A brake caliper 340 may be attached to brake caliper bracket 330 when placed in operative connection with brake disk 310. Brake caliper bracket 330 is attached to attachment frame 224 via connectors such as bolts. In the illustrated embodiment, double sealed stainless steel ball bearings 230 (for a ¾ inch shaft diameter) were seated on each side of axle housing 220. A number of drive wheel axle spacers 240 were also used as illustrated, for example, in FIG. 3D. A washer 250 and a connector 260 such as a hex screw cooperated with drive wheel axle 204 to maintain the assembly in connection at the ends thereof.

In a number of embodiments, pneumatic motors 140 were pneumatic radial piston motors. Examples of pneumatic radial piston motors suitable for use herein include, for example, a Pacific 2000 PMO 1800 (a pneumatic radial piston motor available from PTM Mechatronics GmbH of Egenhofen, Germany via Pacific 2000 of Orange, Calif. under product number PMO 1800-1-0-0-0-0 and having a rated maximum torque under load of 1600 Ncm or 16 Nm) or a BIBUS® EasyDrive PMO 1800 (a pneumatic radial piston motor available from Bibus AG of Fehraltorf, Switzerland and having a rated maximum torque of 1600 Ncm or 16 Nm). Other pneumatic radial piston motors such as BIBUS EasyDrive PMO 3600 (a pneumatic radial piston motor available from Bibus AG and having a rated maximum torque under load of 3200 Ncm or 32 Nm). The PMO 3600 model could output approximately twice the total torque as the PMO 1800 model, which also results in half the output velocity.

The technical specifications of both the PMO 1800 and the PMO 3600 motors are, for example, set forth in Pneumatic Radial Piston Motor, BG-002-08, Luftmotorenkatalog, V10, indd 4 (2008) available from Bibus AG, the disclosure of which is incorporated herein by reference. The pistons of motor 140 are arranged in a star pattern and slide along a curved surface of the casing. Pressurized gas/air is supplied from the center of motor 140 to each vane through a fixed piston control shaft by way of the floating piston control ring, which enables each piston to be activated in order. The air forces these pistons to push on the housing, thereby causing rotation. Larger diameter tubing between the source of pressurized gas and motor 140 enables greater air flow to each piston, increasing the range of speeds at which motor 140 can rotate to the limit of the maximum port size in the motor (for example, 3.175 mm or ⅛ inch BSPT (British Standard Pipe Thread)). Increasing the operating pressure improves the overall performance of motor 140. Adjusting the gear ratio on can increase either the output torque or velocity, depending on the criteria that need to be met.

In a number of embodiments, a value or quotient equal to the rated payload in Newtons or N of the personal mobility device divided by the cumulative maximum torque in Nm (without gearing or conversion) of the pneumatic motor(s) of the device (in the operating range of pressure thereof) is no greater than 55.6. For example, in the case of a PMD weighing 756 N (170 pounds) and being rated for used with a person weighing up to 1023.1 N (230 pounds), the maximum rated payload of the PDS is 1779 N (400 pounds; that is, the weight of the device plus the maximum weight of the occupant). In such a device, the cumulative maximum torque of the motor(s) is at least 32 Nm. The cumulative maximum torque may, for example, be provide by a single pneumatic motor having a maximum torque of 32 Nm, by two pneumatic motors which each have a maximum torque of 16 Nm, etc. The value or quotient of 55.6 is based upon travel on surfaces compliant with the requirements of the Americans with Disabilities Act or ADA. In the case of travel over surface that are not compliant with the ADA such as grass or beach surfaces, the value or quotient equal to the rated payload in Newtons or N of the personal mobility device divided by the cumulative maximum torque in Nm of the pneumatic motor(s) of the device is no greater than 27.8. In a number of embodiments, the cumulative maximum torque (without gearing/conversion) of the pneumatic motors hereof is at least 16 Nm, at least 24 Nm, at least 32 Nm, at least 48 Nm, at least 64 Nm or at least 80 Nm. A cumulative torque of 16 Nm may, for example, be used in PMD for use with small or pediatric users.

As described above, pneumatic motors 140 hereof include a rotating output or drive shaft 142. Output or drive shaft 142 may be connected directly to drive wheel 150 of PMD device 100 hereof or connected through an intermediate mechanism such as, for example, a gear system or pully system as described above. In a number of embodiments of pneumatic motors hereof, output or drive shaft 142 has a maximum rotational speed (in the operating pressure range thereof and without gearing/conversion) of no greater than 2000 rpm, no greater 1000 rpm, no greater than 600 rpm of no greater than 400 rpm.

A control system topology for PMD 100 is illustrated in FIG. 2. In summary, pressurized air (or another pressurized gas) stored in the high pressure (for example, 31 MPa (310 bar or 4500 psi)) pressurized gas cylinders 120 is regulated to pressures between 80 and 120 psi via a pressure regulator 124. The air then exits pressure regulator 124 and splits between going to a manually operated control system such as a pneumatic joystick control system 400 and an air pilot directional valve 500. As described further below, pneumatic joystick control system 400 directs the airflow to pneumatic motors 140 based on the direction that manually operated actuator such as a joystick 410 is moved (that is, forward, reverse, left, right, or any combination thereof) by the operator (for example, using the operator's hand). Each rotary piston pneumatic motor 140 has two ports 141*a* (forward) and 141*b* (reverse). The direction of airflow into and out of each port 141*a* and 141*b* determines the direction that motor 140 rotates.

The air pilot directional valve 500 supplies air to a brake actuator system 600 such as a spring return pneumatic actuator described further below which releases/disengages brake caliper 340 of brake assembly 300 when joystick 410 is moved from its predetermined center, resting or stationary position. Spring return pneumatic actuator 600 actuates or applies brake caliper 340 of brake system 300 when joystick 410 is at its center (e.g., neutral position) or when there is no air in the system. Air pilot directional valve 500 is operated via a pilot signal received through a combination of shuttle valves 710*a* and 710*b* of a shuttle valve system 700. In the illustrated embodiment, the two inputs of a first shuttle valve 710*a* are connected to the forward input 141*a* of the left pneumatic motor 140 and the reverse input 141*b* of the right pneumatic motor 140. The inputs of second shuttle valve 710*b* are connected to the forward input 140*a* of right pneumatic motor 140 and the output of first shuttle valve 710*a*. The output of second shuttle valve 710*b* is then connected to the pilot port of air pilot directional valve 500. Airflow limiters or speed controllers 8001*f*, 8001*r*, 800*rf* and 800*rr* are placed in line with the forward and reverse lines connected to each of pneumatic motors 140. Airflow limiters 8001*f*, 8001*r*, 800*rf* and 800*rr* allow air to flow freely in one direction and limit flow in the opposite direction. Airflow limiters or speed controllers 8001*f*, 8001*r*, 800*rf* and 800*rr* were oriented such that the air is restricted on the exhaust port of the pneumatic motors.

The pneumatic control system, as for example, illustrated in FIG. 2, can be divided into two main components, a joystick/propulsion system and a braking system. Both systems are supplied by pressurized gas cylinders 120. Pressurized gas cylinders 120 may, for example, store compressed air at 31 MPa (310 bar or 4500 psi) and provide all the energy to propel and stop the PMD 100. As described above, the 31 MPa (310 bar or 4500 psi) air is regulated down to a working pressure range of 80-120 psi with a pressure regulator 124 (for example, an Aqua Environment Regulator available from Aqua Environment Co. Inc. under product number 415-400-NV-NA). The lower pressure air exiting regulator 124 then passes through an on/off valve 402 (for example, a Panel Mount on/off valve available from McMaster Carr of Aurora, Ohio under product number 4118T620) which serves as the supply switch for all three loops of the control system, and a main flow control valve 404 of joystick control system 400 (for example, a flow control valve available from McMaster Carr under product number 8346k150) which allows the operator to limit the maximum speed of PMD 100. The flow then is split with one leg going to actuator 600 for brake assembly 300 and the other to a joystick valving system of joystick control system 400 for control and propulsion.

Joystick control system 400 is illustrated, for example, in FIGS. 5A through 5L. In the illustrated embodiment, the joystick valving system includes four air directional control valves 420*rf* (in fluid connection with right motor forward input 141*a*), 420*rr* (in fluid connection with right motor rearward input 141*b*), 4201*f* (in fluid connection with left motor forward input 141*a*) and 4201*r* (in fluid connection with left motor rearward input). In a number of embodiments, the control valves were air directional control valve available from McMaster Co. Inc. under product number 6464k130. Valves 420*rf*, 420*rr*, 4201*f* and 4201*r* are supplied with 80-120 psi compressed air. When the operator pushes joystick 410 in the forward direction, a directional control valve activator 414 (connected to joystick 410 via a joystick level arm 412) opens the valves 4201*f* and 420*rf* (positioned rearward of directional control valve activator 414), which allows air to flow to the forward ports 141*a* of both motors 140 (a rotary piston pneumatic motors available from Pacific 2000 under the product number PMO 1800-1-0-0-0-0), thereby propelling PMD 100 in a forward direction. Joystick lever arm 412, may for example, pass through a ball joint 416 which is connected to a housing 450 for joystick control system 400. When the operator pushes joystick 410 rearward, directional control valve activator 414 activates/opens valves 4201*r* and 420ƒƒ (positioned forward of directional control valve activator 414) and compressed air flows to rearward ports 141*b* of both motors 140. When joystick 410 is pushed left or right, one motor 140 receives a forward flow of air and other motor 140 receives a rearward flow, enabling PMD 100 to turn with full differential steering. While traveling forward or reverse, the operator may move joystick 410 in the direction they want to turn which will decrease or remove airflow from the inner drive wheel 150 of the turn. If the operator needs to turn sharply, they can push joystick 410 farther in the direction of the turn which will engage the rearward flow of inner drive wheel 150 (assuming PMD 100 was traveling forward initially), thus braking inner drive wheel 150 with airflow and causing PMD 100 to turn quickly.

Figure 5A:
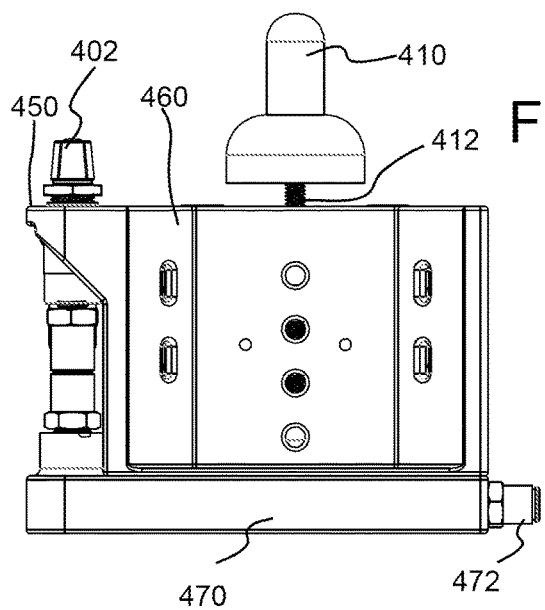
FIG. 5A illustrates a side view of an embodiment of a manually operated control system hereof a manually operated actuator in the form of a joystick.
Figure 5B:
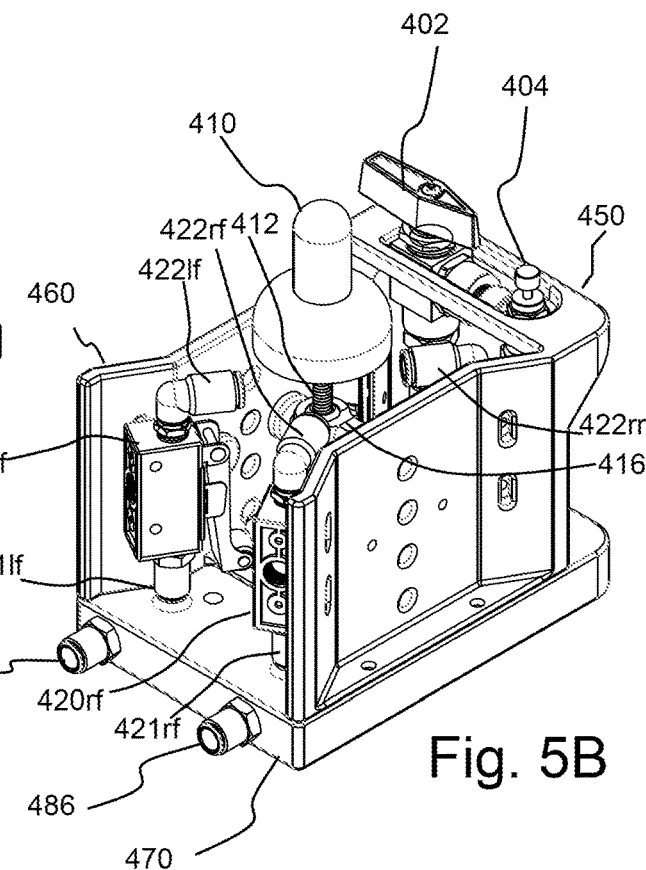
FIG. 5B illustrates a perspective view of the manually operated control system of FIG. 5A.
Figure 5C:
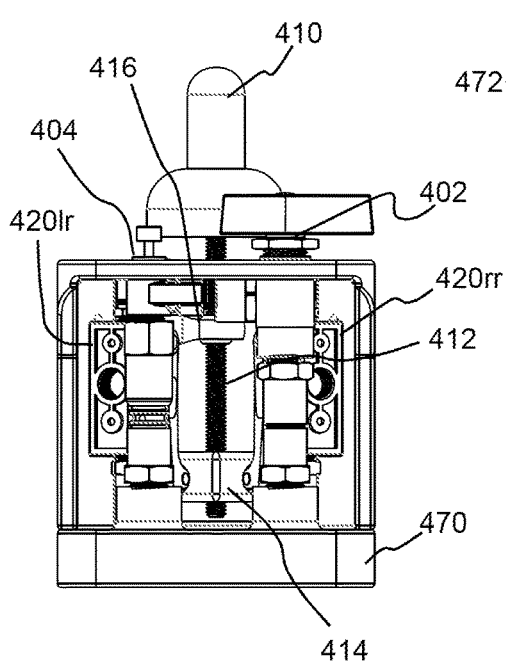
FIG. 5C illustrates a front view of the manually operated control system of FIG. 5A.
Figure 5D:
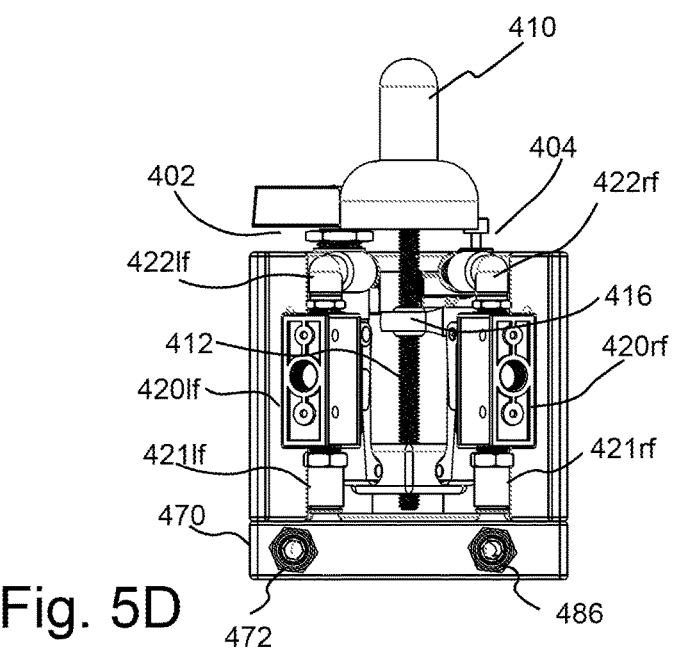
FIG. 5D illustrates a rear view of the manually operated control system of FIG. 5A.
Figure 5I:
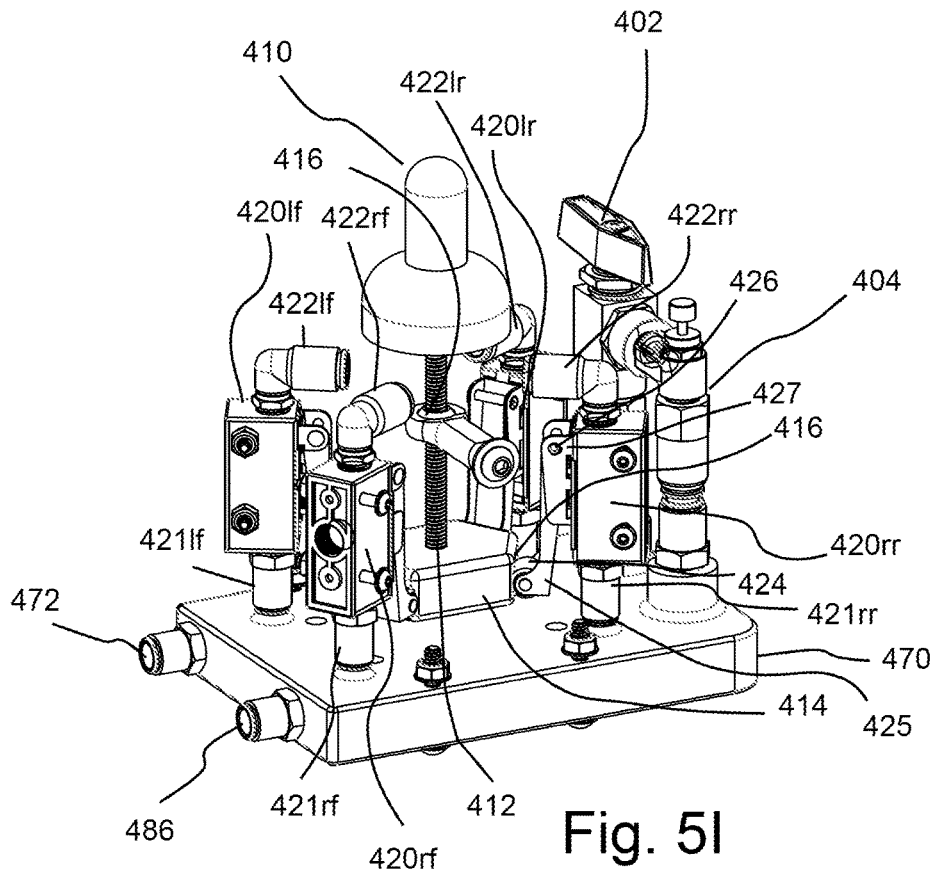
FIG. 5I illustrates a perspective view of the manually operated control system of FIG. 5A with a portion of the housing removed.
Figure 5J:
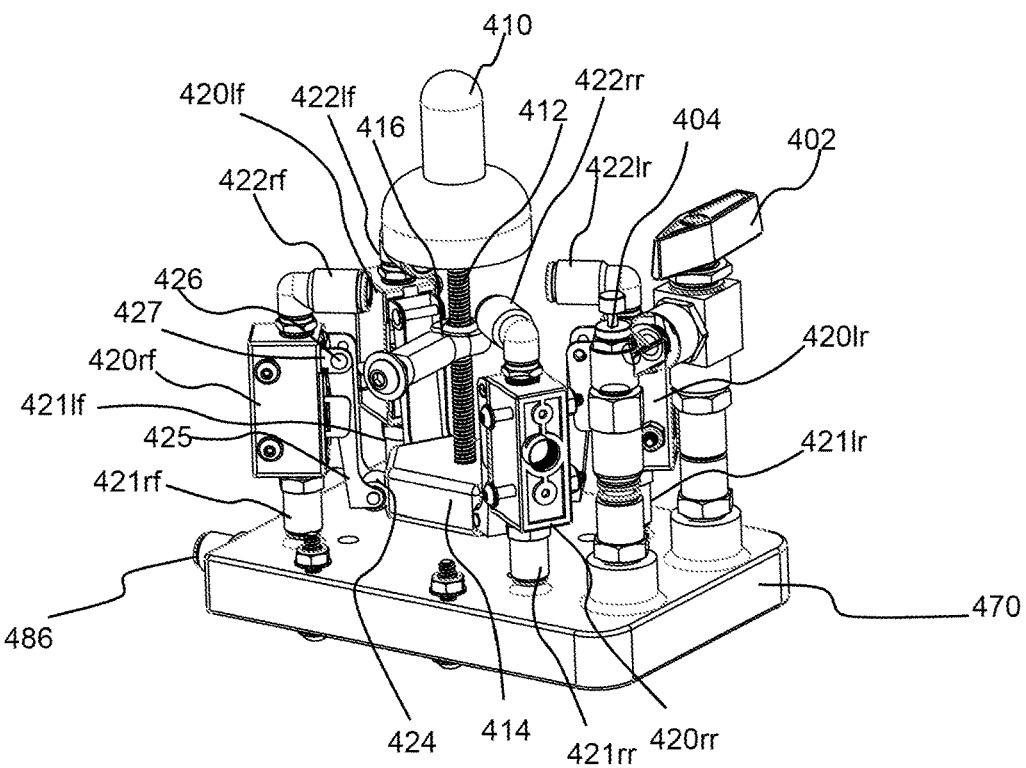
FIG. 5J illustrates another perspective view of the manually operated control system of FIG. 5A with a portion of the housing removed.
Figure 5K:
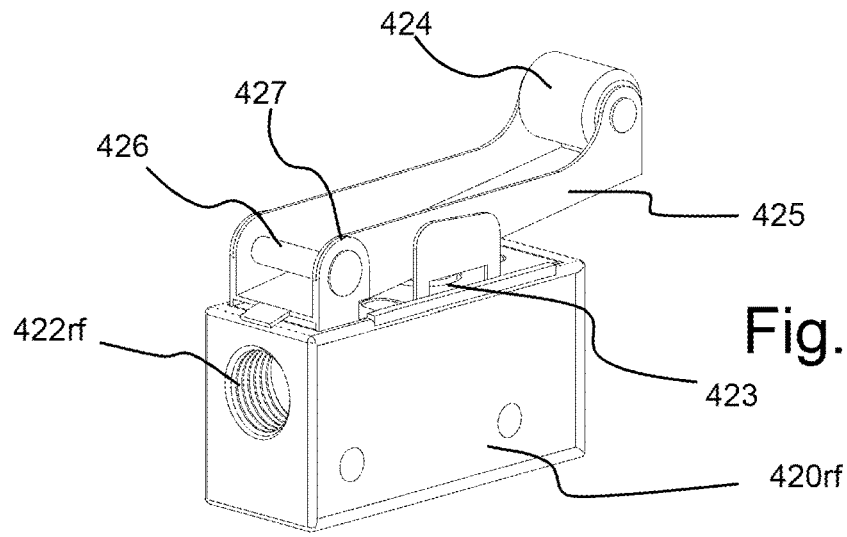
FIG. 5K illustrates a perspective view of an embodiment of a directional control valve of the manually operated control system of FIG. 5A.
Figure 5L:
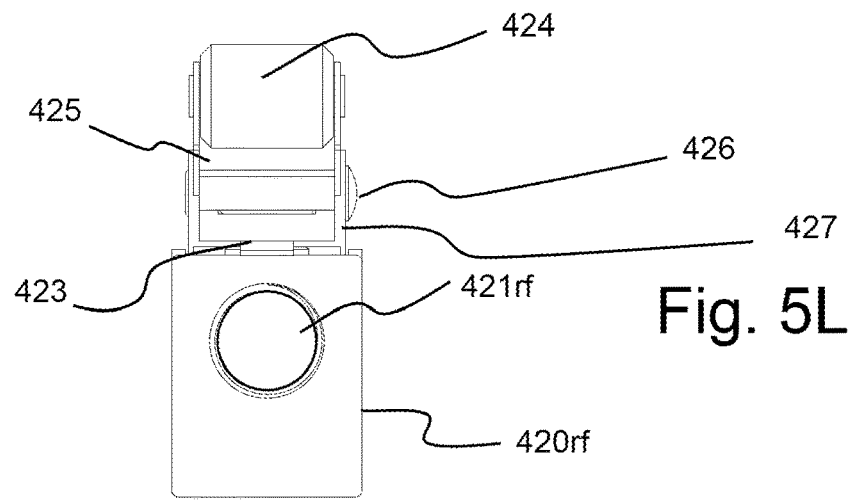
FIG. 5L illustrates a bottom view of the directional control valve of FIG. 5K.

The actuation of the directional control valves via directional control valve actuator 414 is discussed in more detail in connection with FIGS. 5I and 5L. Directional control valve actuator 414 includes an engineered, three-dimensional surface configuration which contacts a follower such as a roller 424 on the bottom or lower end of a lever arm 425 of each of directional control valves 4201*f*, 4201*r*, 420*rf* and 420*rr*. The follower operates in a similar manner to a follower on a cam surface. The three-dimensional surface of directional control valve actuator 414 is configured or shaped to provide the desired control as described herein for varying position of the handle portion of joystick 410 under user manipulation and in a centered position in the absence of user manipulation. Once again, the three-dimensional surface conformation or configuration is configured to provide a predetermined control profile. The conformation can be changed to, for example, control sensitivity (for example, turning sensitivity may be decreased with increasing speed).

Figure 5M:
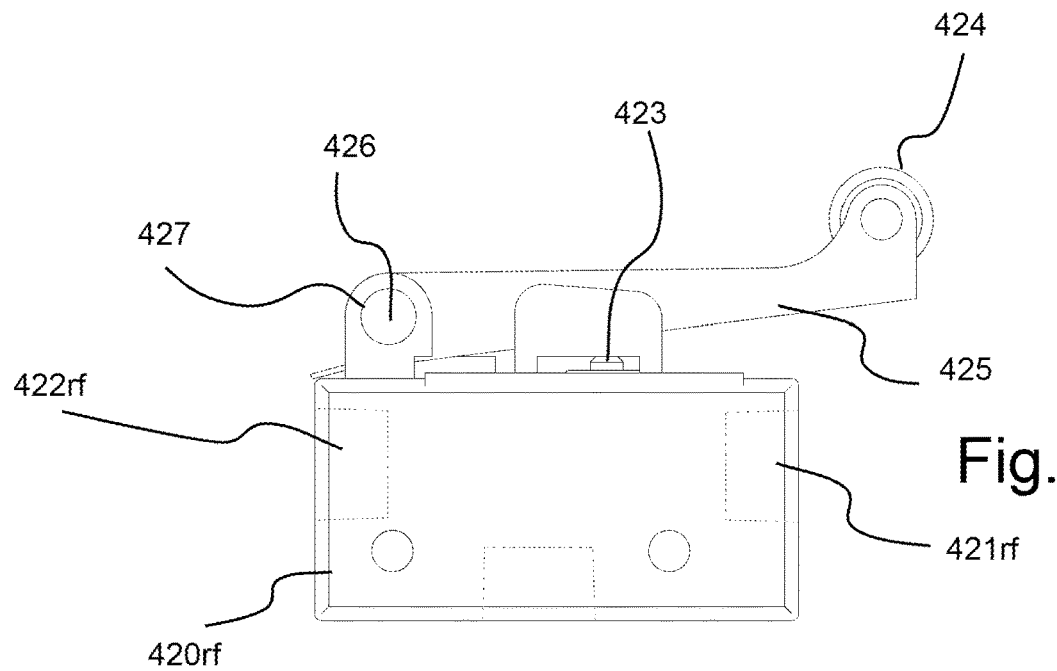
FIG. 5M illustrates a side view of the directional control valve of FIG. 5K.

In the illustrated embodiments, a biased lever arm 425 rotates about a pin 426 at an upper end of lever arm 425, which is connected to a bracket 427 positioned at a top portion of each of the directional control valves. Lever arm 425 contacts a valve actuator 423 (see FIGS. 5K through 5M) of each of directional control valves 4201*f*, 4201*r*, 420*rf* and 420*rr* to control flow of air from an inlet 4211*f*, 4211*r*, 421*rf* and 421*rr* to an outlet 4221*f*, 4221*r*, 422*rf* and 422*rr* thereof respectively. Inlets 4211*f*, 4211*r*, 421*rf* and 421*rr* are in fluid connection with speed controller valve 404. Outlets 4221*f*, 4221*r*, 422*rf* and 422*rr* are in fluid connection with left motor forward port 141*a*, left motor rearward port 141*b*, right motor forward port 141*a* and right motor rearward port, respectively. To avoid crowding and confusion in the drawings, roller 424, lever arm 425, pin 426 and bracket 427 are not labeled in all instances in the figures (see, for example, FIG. 5J for the manually operated control system and only for right forward directional control valve 420*rf*). Right forward directional control valve 420*rf* is also illustrated in FIGS. 5k through 5M.

Joystick 410 is returned to a predetermined center, resting or stationary position in the absence of manipulation by an operator of PMD 100 by an inward bias (that is, a bias toward the generally centrally located directional control valve actuator 414) on lever arms 425 via actuators 423. In a number of embodiments, lever arm 416 of joystick 410 is oriented generally vertically (that is, in alignment with gravitational force) such that gravity assists in bringing extending lever arm 416/joystick 410 to a generally vertical center, resting or stationary position.

The use of joystick lever arm 412 extending in a first direction (for example, generally vertically downward with respect to the orientation of gravity) and valve lever arms 425 extending in a second, different direction (for example, generally upward), which are coupled via control valve activator 414, provides an additive leveraging or mechanical advantage in a very compact space. Using such a configuration, the force required to operate joystick 410 to control PMD 100 was maintained relatively low (for example, no greater than 10 N or less than 10 N). In a number of embodiments, the force required to operate/move joystick 410 was approximately 5 N.

Figure 5N:
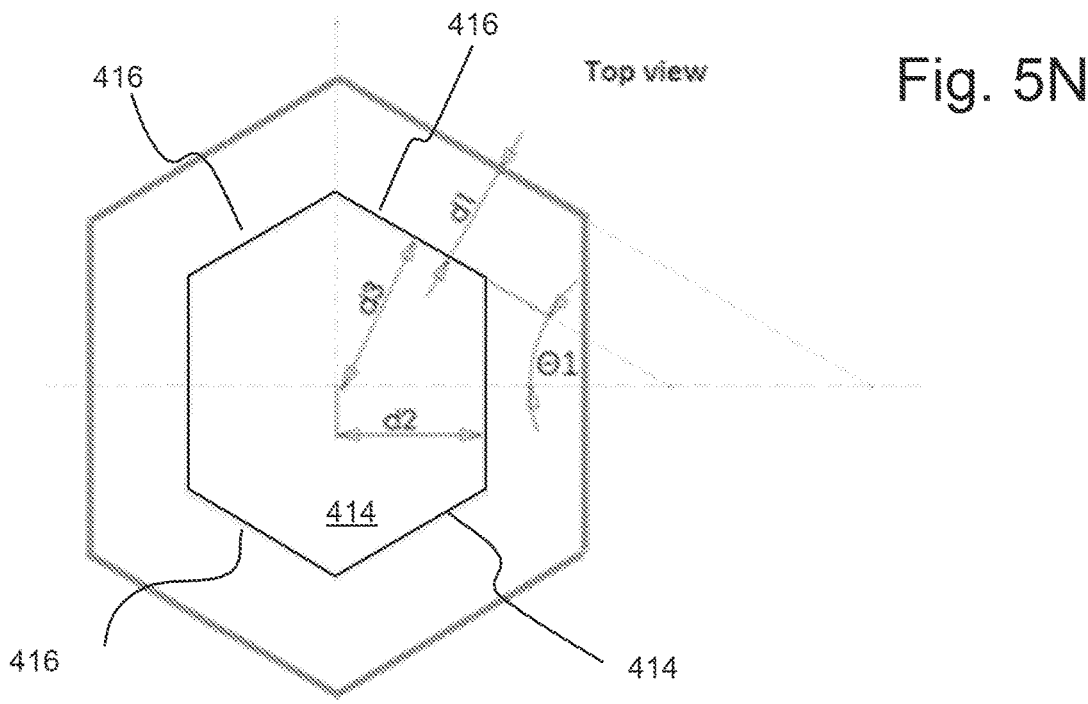
FIG. 5N illustrates schematically a top view of a valve actuator member of the manually operated control system of FIG. 5A.
Figure 5O:
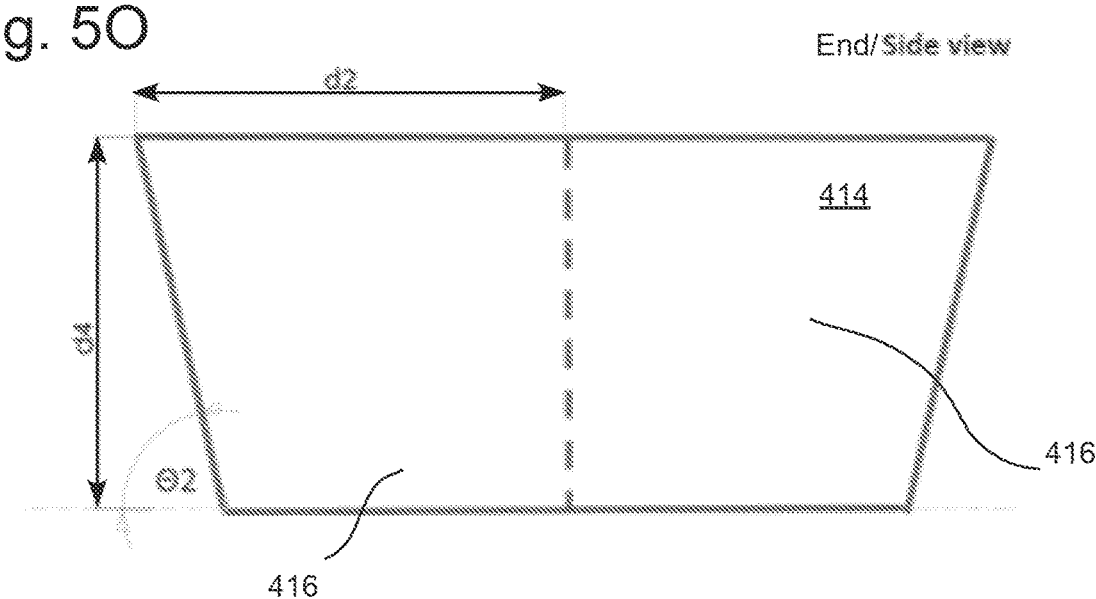
FIG. 5O illustrates schematically a side view of a valve actuator member of the manually operated control system of FIG. 5A.

A representative example of a surface profile for directional control valve actuator 414 is illustrated in FIGS. 5N and 5O. In a number of embodiment, directional control valve actuator 414 was generally hexagonal-shaped. The three-dimensional contact surface configuration of directional control valve actuator 414 was determined by assuring that when the joystick was moved forward, reverse, left, right, or any combination thereof, that the three-dimensional surface of directional control valve actuator 414 maintained contact with the follower/roller 424. The sensitivity could be adjusted by adjustment of the angle θ2 of fours sides/surfaces 416 of the three-dimensional surface. In that regard, changing angle θ2 of the contact surface requires joystick 410 to either move more or less to activate directional control valves 4201*f*, 4201*r*, 420*rf* and 420*rr*. In the embodiment of FIGS. 5N and 5O, d1 is the required distance to activate direction control valve 420*xx*, d2 is the width of direction control valve activator 414, d3 is the length in a diagonal direction of directional control valve activator 414, d4 is the height of directional control valve activator 414, θ1 is the angle of roller 424, and θ2 is the angle of side surfaces 416 of directional control valve activator 414.

In a number of embodiments, joystick control system 400 includes a housing 450 which at least partially encompasses some or all of the components thereof. In a number of embodiments, joystick housing 450 included a main body section 460 and a lower or base section 470, each of which may, for example, be formed from a polymeric material. Main body section 460 and a lower or base section 470 may, for example, be formed separately and be connected via connectors such as screws. In the illustrated embodiment (see, for example, FIGS. 5E through 5G), a manifold or flow system is formed in base section 470. In that regard, an inlet port 472, which is placed in fluid connection with pressure regulator 124 is in fluid connection with a channel or conduit 474 passing through base section 470, which terminates in a port 476, which, for example, extends from base section 470 to be placed in fluid connection with an inlet port of on/off valve 402. An outlet port of on/off valve 402 is in fluid connection with an inlet port of speed control valve 404. An outlet port of speed control valve 404 is placed in fluid connection with a port 478 of the manifold system of base section 470. Port 478 is in fluid connection with a channel or conduit 480 which passes through base section 470 in, for example, the manner of a loop to be in fluid connection with ports 482 which, for example, extend from base section 470 to be placed in fluid connection with inlets 4211*f*, 4211*r*, 421*rf* and 421*rr* of directional control valves 4201*f*, 4201*r*, 420*rf* and 420*rr*, respectively. Channel or conduit 480 is also in fluid connection with a port 486, which is placed in fluid connection with pilot air control valve 500.

In the illustrated embodiment, an upper end and rearward end of housing main body section 460 may be enclosed by an upper or lid section (not shown). A manifold system may, for example, be formed in such an upper or lid section to connect with outlets 4221*f*, 4221*r*, 422*rf* and 422*rr* of directional control valves 4201*f*, 4201*r*, 420*rf* and 420*rr*, respectively. Alternatively, a portion of housing 450 may be left open for passage of tubing (not shown) from outlets 4221*f*, 4221*r*, 422*rf* and 422*rr*. Providing manifolds and/or flow channels in housing 450 simplifies design and eliminates complex tubing arrangements which may, for example, result in spatial limitations.

In the case that housing 450 is fully enclosed, all lines in and out thereof and/or control elements extending therefrom may be sealed (for example, via gaskets as known in the art) such that water and/or debris is/are substantially or completely prevented from entering housing 450. One or more ports 471 may be provide in base section 470 to drain any water which may infiltrate housing 450 with the assist of gravity. Such ports may include one-way, check valves. Exhaust from valves 4201*f*, 4201*r*, 420*rf* and 420*rr* may, for example, be used to create a slight positive pressure within housing 450 to assist in preventing entry of water or debris and/or to assist in eliminate any water or debris from housing 450. Moreover, a muffler can be integrated with the housing to diminish noise.

Figure 6:
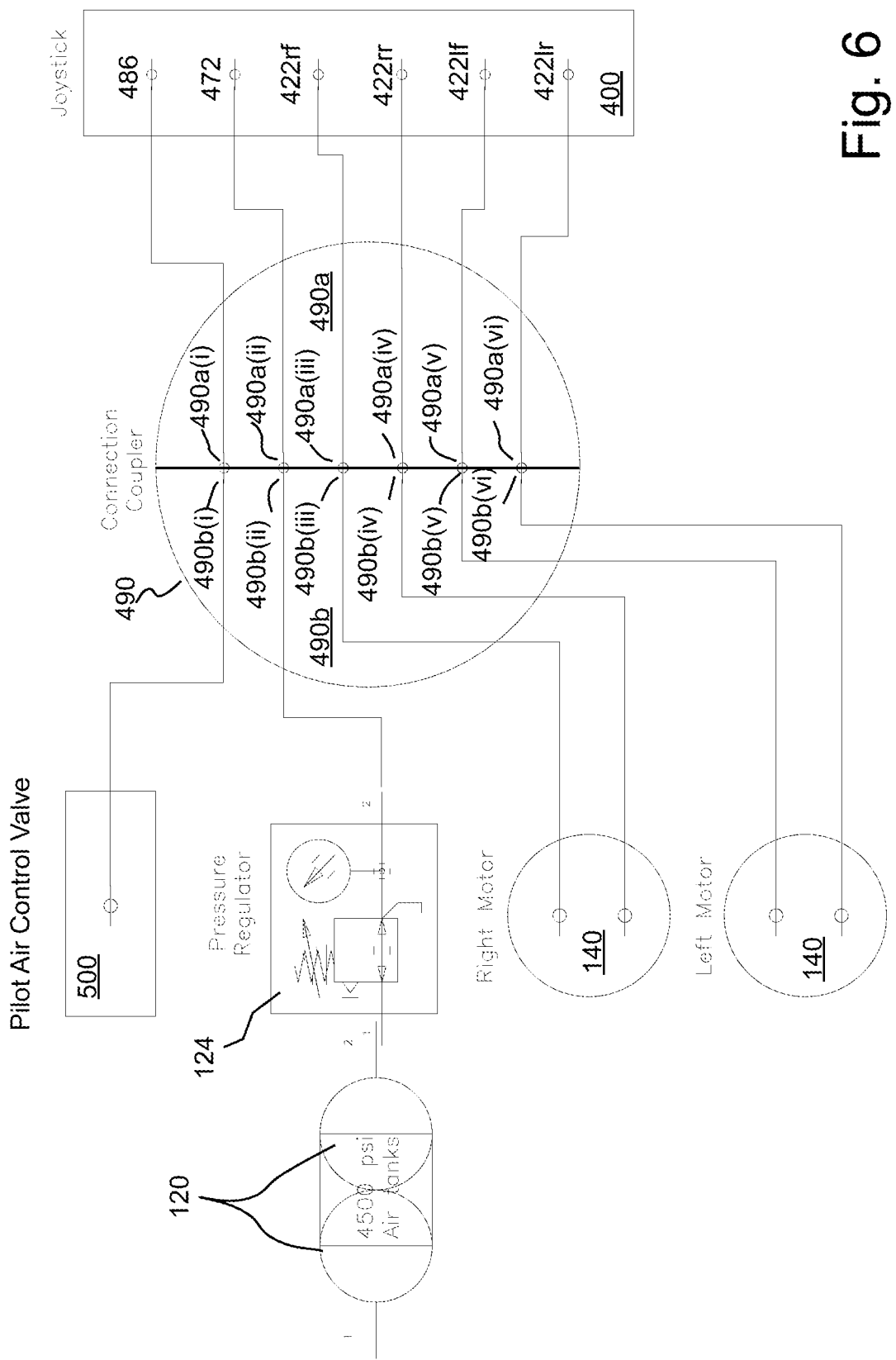
FIG. 6 illustrates schematically a coupler for use in connection with hosing or tubing lines of the mobile devices hereof.

In a number of embodiments, it may be desirable to position joystick control system 400, for example, at any one of a right-hand position (as, for example, illustrated in FIG. 1A), at a left-hand position or at an intermediate position therebetween. However, disconnecting and reconnecting hosing or tubing lines going into and out of joystick control system 400 must be accomplished very carefully to prevent incorrect connections which may render PMD 100 inoperable. In a number of embodiments, a connection coupler 490 (see FIG. 6) is provided to ensure that outlets 4221*f*, 4221*r*, 422*rf* and 422*rr* of directional control valves 4201*f*, 4201*r*, 420*rf* and 420*rr* are correctly connected ports 140*a*, 140*b* of left motor 140 and ports 140*a*, 140*b* of right motor 140, respectively, and that, port 486 is connected to pilot air control valve 500 and inlet port 472 is connected to pressure regulator 124. Connection coupler 490 may, for example, include a first connector 490*a*, which includes ports 490*a*(*i*), 490*a*(*ii*), 490*a*(*iii*), 490*a*(*iv*), 490*a*(*v*) and 490*a*(*vi*) in fluid connection with port 486, inlet port 475, directional control valve 4201*f*, directional control valve 4201*r*, directional control valve 420*rf* and directional control valve 420*rr*, respectively. In that regard, first connector 490*a* includes a port in fluid connection with only one of each of the plurality of tubing lines in fluid connection with joystick or manual controller system 400. Connection coupler 490 may, for example, also include a second connector 490*b*, which includes ports 490*b*(*i*), 490*b*(*ii*), 490*b*(*iii*), 490*b*(*iv*), 490*b*(*v*) and 490*b*(*vi*) in fluid connection with pilot air control valve 500, pressure regulator 124, forward port 141*a* of right motor 140, rearward port 141*b* of right motor 140, forward port 141*a* of left motor 140 and rearward port 141*b* of left motor 140, respectively. First connector 490*a* and second, cooperating connector 490*b* are releasably connectible such that ports 490*a*(*i*), 490*a*(*ii*), 490*a*(*iii*), 490*a*(*iv*), 490*a*(*v*) and 490*a*(*vi*) must be placed in sealing connection with ports 490*b*(*i*), 490*b*(*ii*), 490*b*(*iii*), 490*b*(*iv*), 490*b*(*v*) and 490*b*(*vi*) (for example, using orientation specific or dimensional specific connection mechanisms as known in the connector arts). Second, cooperating connector 490*b* thus includes a plurality of ports, wherein each one of the plurality of ports of second, cooperating connectors 490*b* is configured to be placed in fluid connection with only one of the plurality of ports of first connector 490*a* upon connection therewith. Each port of the plurality of ports of the second connector is in fluid connection with a predetermined component as, for example, described in connection with FIG. 6.

Because of differences in motors, flow systems, and drivetrains it is possible that both motors 140 will not provide exactly the same power when operating. If this is the case, PMD 100 may veer to one side while forward movement is commanded by the operator. To correct for or prevent such a veer, four additional flow control valves 8001*f*, 8001*r*, 800*rf* and 800*rr* were installed close to motors 140 (tamper proof flow control valves available from SMC of, for example, Bethlehem, Pa under product number AS3201F-02-08ST). Flow control valves 8001*f*, 8001*r*, 800*rf* and 800*rr* may, for example, be set when PMD 100 initially assembled or manufactured, and may be made to be tamper proof to prevent unauthorized users from adjusting preset flow rates. In a number of embodiments, flow control valves 8001f, 8001r, 800rf and 800rr (air flow controllers or speed controllers) limit flow in only one direction, so that valves 8001r and 800rr, on the rearward flow lines, are set to reduce the airflow when the operator commands a reverse direction of motion. This arrangement limits the maximum speed of reverse for safety.

For the motors 140 to turn, the port 141a or 141b that is not being energized by the pressure flow becomes the exhaust port. This air must be exhausted to the atmosphere or motors 140 will not function. In the illustrated embodiments, free exhaust is accomplished using quick exhaust valves 9001f, 9001r, 900rf and 900rr (for example, a Legris Quick Exhaust Valve available from Parker Hamilton of Mesa, Ariz. under product number 19H015) mounted near motors 140. Quick exhaust valves 9001f, 9001r, 900rf and 900rr prevent routing exhaust air back up to joystick control system 400, which would undesirably increase the amount of hosing/tubing required and complexity, while reducing the flow rate because of piping losses. Quick exhaust valves 9001f, 9001r, 900rf and 900rr may, for example, be placed in fluid connection with mufflers 10001f, 10001r, 1000rf and 1000rr, respectively, to reduce noise.

In a number of embodiments, brake actuator system 600 uses the 80-120 psi air supply that was split from the propulsion system after passing through speed control valve 404 and is connected to 4-way, 2-position pilot air control valve 500 as described above (for example, a Numatics pilot air control valve available from Asco of Florham, N.J. under product number 3JCP5). Pilot air control valve 500 is triggered by an air source that is drawn from the motor lines of the propulsion system before the air enters the individual speed controllers 8001f, 8001r, 800rf and 800rr for each motor 140. Three of the four lines going into motors 140 (forward left/right, rearward right motor) are tapped to provide the air source. As also described above, these lines are attached to two shuttle valves 710a and 710b (for example, a Jupiter Pneumatics shuttle valve available from MSC Industrial Supply of Melville, N.Y. under product number 78260940) that each have two inputs. Shuttle valves 710a and 710b function as an 'OR' logic device/valve. In that regard, if inlet A or inlet B are pressurized, the outlet will also be pressurized. The outlet of first shuttle valve 710a is connected to one of the inlets of second shuttle valve 710b so that if either of the inlets for first shuttle valve 710a or the remaining inlet of second shuttle valve 710b are pressurized, then the outlet of shuttle valve system 700 will also be pressurized. The outlet of shuttle valve system 700 is connected to the trigger port of pilot air control valve 500 so that whenever pressure is seen on any of the three motor lines or legs connected to shuttle valve system 700, which occurs whenever the operator moves the joystick from its centered position, pilot air control valve 500 will trigger. In other embodiments, whenever pressure is present on any of the four motor lines, air control valve 500 will trigger. In general, if any one of the motor lines in operative connection with valve system 700 is pressurized, pilot air control valve 500 will not actuate and brake actuator system 600 will not be actuated. Air control valve 500 will also trigger in the absence of air pressure in the system.

In the illustrated embodiment, when pilot air control valve 500 triggers, air flows from the supply port of pilot air control valve 500 into a pneumatic actuator 610 of brake actuating system 600, overcoming the static spring force via a spring 614 (see FIG. 2) mounted over cylinder shaft 612 of the pneumatic actuator 610 and drawing cylinder shaft 612 into the cylinder body. Cylinder shaft 612 is operatively connected to a brake handle carriage or pushrod assembly 620 mounted to the end of cylinder shaft 612. In the unpressurized state, brake handle pushrod assembly 620 uses the static spring force of spring 614 to push two hydraulic disc brake levers 630 (for example, hydraulic bicycle disc brake levers), each of which is operatively connected to one of brake calipers 340, to an actuated position, thereby actuating brake calipers 340 to keep drive wheels 150 from turning. When cylinder shaft 612 is drawn into the cylinder body of pneumatic actuator 610 by the triggering of pilot air control valve 500, brake handle pushrod assembly 620 releases hydraulic disc brake levers 630 (to a non-actuated position) and allows the drive wheels to turn freely. Whenever the operator releases joystick 410 so that it returns to its centered position, pilot air control valve 500 switches back to its closed configuration, and the pressure in pneumatic actuator 610 is allowed to exhaust to the atmosphere. This exhaust may, for example, be delayed using an adjustable metering valve with silencer 520 (see, FIG. 2; for example, a metering valve with silencer available from SMC under product number ASN2-N02). The adjustable delay allows the re-engagement time after the operator releases joystick 410 to be tuned for a specific user. If the air is allowed to release slowly, PMD 100 will coast before stopping, and thereby provide gentle braking. If the air is released quickly, PMD 100 can stop almost immediately following release of joystick 410. However the "jerkiness" of the braking will increase.

Although the drive systems, control systems and braking systems hereof have been described predominantly in connection with wheelchair 100, including two drive wheels 150, the drive system, control systems and/or braking systems hereof may be used in connection with other devices, systems and/or methods. Devices and methods hereof may be used in connection with independently powered PMD motors as in wheelchair 100. In such configurations, pneumatic motors are driven either directly or through a drivetrain (geared, etc.) on an individual basis. Each motor has its own power source that is controlled by a control system. The motors may also be controlled independently so that one can be stopped or reversed while the other is driven forward to allow differential steering of the wheelchair. The wheels may or may not also be braked using a braking system.

In independently braked wheelchair drives, the wheels may be powered either independently through direct drive or a drivetrain system as described above, or through the use of a differential. In either case. the powered wheels are braked independently using a control system to slow or stop an individual wheel when turning is desired. This operation is similar to the independently powered wheelchair motors above, but individual wheels cannot be driven in reverse using this method, which limits its maneuverability.

In a single-drive-wheel system, a stable base of at least three unpowered wheels is attached to the frame to provide contact the ground plane. In addition to the at least three unpowered wheels, there is at least one additional wheel that is powered and contacting the ground plane. This drive wheel provides the propulsion for the device. The driven wheels may or may not be able to turn directly or via a linkage or actuation system, which provides the steering control for the device. In certain cases, it may be possible to use multiple driven wheels, which are independently powered or braked to provide differential steering for the device (this has not been implemented before as far as I know however).

In a front-wheel-drive scooter, the drive motor and steering are combined into one unit and use a single front wheel to control both steering and propulsion. The motor may directly or indirectly (through the use of a chain, gear train, etc.) drive the front wheel. The motor may also be attached to the tiller such that it rotates with the tiller and front wheel while turning. A braking system may also be included on the front wheel, or the rear unpowered wheels may be braked in any combination.

In a rear-wheel-drive scooter, one or two of the rear wheel(s) is/are powered, and the front wheel(s) provide steering. The rear wheel(s) may, for example, be powered either with a differential (using one motor to power the differential), one motor driving one rear wheel while the other is unpowered (in the case of a four-wheel design) or using a 'tadpole' configuration where there is a single, powered rear wheel and two unpowered front wheels. In the case that there are two front wheels, the two front wheel may, for example, be steered using a linkage system between them. In embodiments in which there two rear wheels, there can either be two front wheels steered using a linkage system, or one front wheel that is directly controlled with the tiller. Brakes can either be applied to the differential, using one brake controlling both rear wheels, or individually to each of the wheels in any combination of braking and propulsion.

FIGS. 7A through 7C illustrated another personal mobility device hereof in the form of a PMD or scooter 100a. In a number of respects, the control system, drives system and braking system of PMD 100a operates in the same or a similar manner of corresponding systems of wheelchair 100a and corresponding elements or components are designated with similar reference numerals wherein the designation "a" is added in the case of scooter 100a. In the embodiment of FIG. 7A through 7C, PMD 100a include two rear wheels 150a. The left-side rear wheel is removed from PMD 100a in FIGS. 7A and 7B. In PDM 100a, a pneumatic motor 140a (for example, a rotary piston pneumatic motor) was mounted to a plate 164a mounted on a rearward end of frame 110a. A sprocket 170a may, for example, be secured to and rotated about the end of the output or drive shaft of motor 140a. Sprocket or gear 170a may, for example, operatively connected to a gear or sprocket (not shown) of a differential 810a (for example, a limited slip differential) on a rear axle of PMD 100a via a drive chain (not shown). Use of a pneumatically powered differential to drive rear wheels of a PMD is described in PCT International Publication No. WO2017/120814, the disclosure of which is incorporated herein by reference.

Pneumatic motor 140a is powered by pressurized gas tanks 120a via an intermediate regulator (not shown) as described above. In the illustrated embodiment, tanks 120a are supported on supports 130a.

Front wheels 160a are used to steer PMD 100a via a modular steering assembly 162a which is attachable to a forward section of frame 110a. Modular steering assembly 162a include a steering linkage 164a (as known in the scooter arts) and a steering interface or steering wheel 166a.

A control system 400a is attached to steering interface 166a. Control system 400a includes one or more manually operated actuators as described above. In the illustrated embodiment, a wigwag controller 410a, including right and left manual contact elements 410a', pivots about pivot point 411a. Wigwag controller 410a includes a control valve actuator or control valve actuator surface 414a which pushes against control valve followers 426a of a control valves 422a-rf and 422a-rr (see, FIG. 7C). As described above followers 426a are attached to an end of a lever arm 425a.

Lever arms 425a operate as described above to control directional control valves 422a-rf and 422a-rr to drive PMD 100a forward or rearward.

Also similar to brake system 600 as described above, a pneumatic actuator 610a activates/deactivates a brake system including, for example, a brake lever 630 which cooperated with a brake system including a caliper 340a and a brake disk 310a. When PMD 100a is at rest (and, manually operated actuator 410a is in a rest or neutral position) an actuator of pneumatic actuator 610a is, for example, extended, which pulls on the brake cable (not shown) and to activate the brakes. When the forward or reverse directional control valve (420a-rf or 420a-rr, respectively) is activated to drive the PMD 100a forward or reverse via manually operated actuator 410a, pneumatic actuator 610a retracts or compresses, which relieves the tension of the brake cable and deactivates the brakes. The brake activation/deactivation is automatically performed whenever the PMD 100a is driven forward or backward. The operator does not need to activate or deactivate the brakes prior to moving.

In a number of embodiment of PMDs hereof, propulsion and control are effected/controlled solely pneumomechanically (that is, using pneumatic and mechanical systems/components). All power is provided by pressurized gas cylinders or tanks 120 (Great White 97 ft$^3$ carbon fiber air tanks, available from AirTanksForSale.com of Huntington Beach, Calif.). No electronics or electrical energy is required for propulsion or control of the such PMDs.

The design and testing of the PMDs hereof demonstrate that pneumatic technology is a viable replacement for electric powered mobility devices in both fully powered mobility devices as well as power assisted mobility devices. The advantages of pneumatic technology solve many of the longstanding major issues experienced with electric PMD and can decrease the overall lifetime costs of the device. Based on Medicaid and Medicare's replacement guidelines, PMD are expected to have at least a five-year lifetime. A major issue or problem with electric PMD is the frequency that repairs are needed. One study conducted a survey that included power wheelchair users found that of the 239 power wheelchair participants, 65.6% (157/239) needed at least one repair within the six-month period prior to participation in the study. In the study, 49.0% (77/157) of the 65.6% experienced greater than one adverse consequence of which 24.2% (38/157) of the individuals were left stranded. The study also found that the most frequent repairs for power wheelchairs were to the electrical, power, and control systems. When repairs are needed to these systems, they are typically performed by a mobility device supplier, which can be a lengthy process. Unlike electric PMD that experience power issues, many of the components of a pneumatic powered PMD are widely available and affordable. Moreover, such components can be fixed by anyone who is technically skilled. Moreover, such components are designed for years of use with little maintenance. These characteristics decrease the possibility of the user being without a PMD for a long period of time.

Concerns when using pneumatic systems include noise and safety. The noise of a pneumatic system is generated when the air is exhausted out of the pneumatic motor. Typical pneumatic motors have noise levels that average 77 dB. These levels increase with speed and are greatest when under no load. A BIBUS pneumatic radial piston motor used in a number of devices hereof has a noise level of about 60 dB. This noise level is similar to that of a pair of electrically powered wheelchair motors which operate at 58 dB. These levels can be further decreased with the addition of a noise reduction system such as a muffler system as described above. In terms of safety, pneumatic components use no hazardous materials and meet both explosion protection and machine safety requirements because they do not generate magnetic interference.

The high-pressure air or HPA PMD hereof may be "charged" (air tanks filled) via an air compressor that is capable of filling the tanks up to a pressure of, for example, 31 MPa (310 bar or 4500 psi). Preferably, tank of PMD hereof are charge to at least 17.2 MPa (172 bar or 2500 psi). A compressor may be connected to the PMD via a quick disconnect connection, as known in the gas transfer arts, and in a manner similar to how electric PMD are plugged in to an outlet to charge. The length of time required for a full charge of PMD hereof is based on the method of recharging. One method is to have a "filling station" that includes of a large storage tank in operative connection with a compressor that constantly maintains the storage tank pressures at, for example, 31 MPa. In this method, filling the tanks is as simple as connecting the PMD to the storage tank and opening a couple valves to allow air to transfer from the storage tank to the tanks on the PMD. This method takes less than one minute to fill the tanks from an empty state. A second method is similar to the first method but with the absence of the storage tank. The PMD would be connected directly to the compressor as described above. The charge time for this method depends on the size of the compressor. For example, a high-pressure compressor such as the Bauer JUNIOR II™ compressor available from Bauer Compressors, Inc. of Norfolk, Va. has an air flow rate of 100 L/minute. At that rate, it takes approximately 90-120 minutes to completely fill all three tanks from empty to a pressure of 31 MPa. A third method includes having one large or a number of small tanks that are filled to 31 MPa. These tanks operate similarly to the storage tank described in the first method. The PMD could simply be connected to the tank (s) to recharge. To refill the storage tank(s), a mobile air compressor unit may be used or a "bottle service" may be used (that is, a service which picks up empty tank(s) and replaces them with filled tanks). The number of recharges available would be dependent on the size and number of storage tanks. Charging time for this method would be similar to method one (that is, under one minute).

Of the three methods described above, the second and third methods are better suited for in-home charging as a result of their small footprint. For users that need quicker recharges and require multiple recharges throughout the day (for example, as a result of traveling longer distances), the third method may best suit their needs. However, for users who do not travel long distances during the day and only need to recharge a PMD once per day, the second method may be more suitable. Unlike the second and third methods, the first method operates more like a fueling station for vehicles. The filling station of the first method has the capability to recharge numerous devices in a short amount of time. Situations in which the first method may beneficial include, for example, commercial and healthcare facility settings such as airports, shopping malls, amusement parks, hospitals, nursing homes, etc.

PMD typically have a small wheelbase to allow them to fit through doors and be maneuverable indoors. As a result, the size of the pressurized gas tanks is limited. To achieve an extended range, pressurized gas tanks such as HPA tanks similar to those used by firefighters and scuba divers may be used because of their size and safety record. HPA tanks have the capability to be filled up to 31 MPa. Compressor typically found at a local hardware store are not capable of reaching such pressures. However, suitable, high-pressure compressors are commonly available at sporting goods stores that, for example, charge paint-ball tanks, at dive shops, and at fire or emergency medicine technician stations. Air compressors that meet the necessary specifications to fill HPA tanks to 31 MPa typically cost between $250 and $1500 and can be operated for up to 10 years or more with little or no maintenance. HPA tanks cost from $50 to a few hundreds of dollars and are required to be hydro-tested and recertified every 3-5 years at a cost of approximately $20 per tank.

When filling HPA tanks to pressures up to 31 MPa, power consumption versus pressure has a linear relationship. The potential energy of 9 L of air at 20 MPa is 953.7 kJ and at 31 MPa is 1600 kJ. Using the Bauer JUNIOR II compressor with a 2.2 kW motor, the energy consumption to fill a 9 L tank to a pressure of 20 MPa is 2340 kJ in a completion time of 17.75 minutes (0.3 hours), while filling a tank to 31 MPa requires 3960 kJ and a completion time of 30 minutes (0.5 hours). The resulting efficiency of the Bauer JUNIOR II compressor is approximately 41% when filled to either pressure. The energy consumption when charging electric PMD can be as high as 10,370 kJ when considering the maximum charge time of eight hours using a 120 V charger operating at 3 A. When comparing the energy consumption between electric and pneumatic systems, a pneumatic system can be recharged 2.2 more times when filling the system to 30 MPa and 1.3 more times when filling the system to 31 MPa.

The use of pressurized fluid tanks such as high-pressure-air (HPA) tanks (approximately, $100-$150) instead of batteries ($300-$550) may decrease the overall cost of a PMD by, for example, as much as 60%. Additionally, the cost of pneumatic motors as compared to electric motors further decrease costs. Another significant cost associated with batteries is the cost of disposal of the electric batteries when they are no longer operational. Conventional, battery-powered electric drive system also require careful environmental attention when the system is no longer operational. Specifically, the batteries may present an environmental concern. Annual disposal of electric wheelchair batteries presents both a cost and hazardous waste issue. On the other hand, pneumatic systems reduce environmental impact and pose no environmental threats at the time of disposal. Pneumatic tanks may be refilled throughout the life of the PMD.

Pneumatic systems provide lower maintenance requirements as compared to battery/electric powered systems. As described above, batteries used in the conventional electric drive systems have a limited number of recharging cycles. Moreover, such systems require a routine to discharge and recharge the batteries for the batteries to maintain optimal charge/usage characteristics. A pneumatic system, however, can be discharged and recharged an unlimited number of times. Once again, unlike batteries, frequent replacement of the tanks is not required. Indeed, the lifetime of the tank will likely exceed the lifetime of the PMD.

The range of PMD powered by compressed air or other gas is based on the pressure, volume, and temperature of stored gas on the PMD. Air volume can be increased by either increasing the pressure inside the air tank, raising the temperature (for example, through an expansion chamber) or by increasing the tank size. Potentially, an expansion chamber or gas lines (for example, incorporated into the seat of the PMD) may be used to cool the person's body temperature, while heating the gas to increase range. Lower skin temperatures may, for example, reduce the risk of pressure ulcers.

The average electrical PMD battery will last six months to one year. Battery lifetimes are based on numerous factors including battery size/type, charging frequency, level of daily discharge, and daily usage. The range of travel electric PMD is variable based on the terrain traversed and driver habits. Traveling up slopes and travelling at higher speeds tend to decrease the range of a PMD. Therefore, a majority of the batteries of an electrically powered PMD will need to be replaced a minimum of five to six times over the expected lifetime of the device. The cost of battery replacements can range from $100-$500 each time a replacement is necessary depending on the type of PMD Thus, pneumatic technology may result in a savings of approximately $500-$2500 when considering battery replacement alone.

Pneumatic systems have the potential to provide rapid nearly unlimited recharging, lighter weight, lower operating cost, and smaller environmental impact. With the growing availability of lightweight, portable HPA tanks, a pneumatic drive system may strengthen individual independence and mobility as well as lower healthcare and institutional costs. Additionally, efficient pneumatic motors such as rotary piston pneumatic motors increase the practicality of high pressure gas as a practical alternative to electric power for PMD.

Pneumatic systems are also well suited for usage in PMD because of their resilience to environmental hazards such as dirt, heat, and moisture. Environments wherein pneumatic powered systems have a clear advantage over electric powered systems include environments with the presence of water or moisture and environments wherein there are fire/explosion risks (for example, oxygen-rich environments). Unlike battery-powered drive systems, there is no risk of fire, electrical shock or electromagnetic compatibility issues with pneumatic drive systems. Pneumatic and compressed gas systems require very little maintenance and may be driven through water, snow, moisture without difficulty. Robust operating characteristics are very desirable as most wheelchairs receive little or no preventative maintenance. Pneumatic powered PMD have the potential to provide avenues for independent mobility on beaches, in amusement/water-parks, and other areas where the PMD may be exposed to a very wet environment. Moreover, in environments with high relative humidity, a pneumatic powered PMD will have greater reliability and longevity than an electric powered PMD. Such environmental resilience may be an important contribution to powered mobility in rural or less-resourced areas. Pneumatic driven PMD may support community integration by increasing reliability and availability of the PMD and may promote participation in many activities of daily living through improved transportability (for example, as a result of pneumatic powered PMD being lighter in weight that electric powered PMD).

The relatively light weight of pneumatically-powered PMD eases transport concerns in motor vehicles and other transport systems, which is a significant challenge for electric powered mobility devices. Moreover, air travel and other travel may be easier as the compressed gas/air may be drained during flight/transport, and recharged upon arrival, thereby eliminating the need to remove and package batteries for flight.

Pneumatic drive systems may provide further advantages in rural areas, developing countries and other resource-limited areas. Once again, compressed gas such as compressed air requires only, for example, a compressor and a storage tank. Unlike battery-powered systems, a regular and reliable source of electricity is not required. In areas with reduced infrastructure or resources, locating a source of reliable and clean electric power is often a challenge. Compressed gas can, for example, be stored during times when electric power is cheap and/or available. Further, gasoline, diesel, solar, and hydro powered compressors can be used to produce compressed gas/air. Because of the quick charging rate associated with a pneumatic drive system, an area (for example, a remote village) may have a single pneumatic or compressed gas stowage station.

Pneumatic drive systems are also more infrastructure friendly than battery powered systems. For example, in the case of fleet electric powered mobility devices, multiple wall outlets are required and may undergo significant wear and tear with the use of battery chargers. Pneumatic systems may require, for example, only one compressor and a high-pressure storage tank (instead of multiple battery chargers). Pressurized gas/air hardware is much more robust than residential and retail electrical outlet construction. Only one outlet is required for the compressor, and the plug would not need to be removed frequently.

Moreover, use of pneumatic drive systems in a fleet of PMDs (for example, as used in a store/mall complex, airport or a park) may reduce the number of vehicles required in the fleet, thereby reducing storage space, maintenance costs and other costs/requirements associated with maintaining a large fleet. In that regard, because 5 to 8 hours of charging time is often associated with battery-powered fleets, a large percentage of a battery-powered fleet (for example, 50%) may be unavailable for use. The quick recharge time of a pneumatic drive system may thus significantly reduce the number of vehicles required in a fleet.

Pneumatic power and electric power may be readily combined in a PMD to take advantage of the strengths of each system. For example, one may include electric power (via limited battery energy) in a pneumatically powered PMD to add power seat functions, to incorporate computer control or to provide more complex user interfaces.

Pneumatic motors inherently provide high-torque at low-speeds and are naturally compliant. PMD driving is a low-speed and frequent start/stop driving task. PMD are thus well suited for pneumatic/compressed gas drive systems. Further, wheelchair users must drive indoors and in close proximity to people. This often results in purposeful (e.g., opening a door) or inadvertent contact (e.g., hitting a wall). Pneumatic drive systems are naturally compliant, reducing risk of harm to people, the surrounding environment, and the mobility device.

As described in a number of representative examples hereof, pneumatic drive system may be readily incorporated or retrofitted into electric/battery powered PMD as well as manual wheelchairs (for example, to augment or replace the arm power of the manual wheelchair user). Pneumatic drive systems are well suited in this application as weight is critical for manual wheelchair users. Furthermore, the propulsion may be intermediate and low power. The natural compliance of compressed gas systems may also help with the coupling with the person and the pneumatic motor.

Pneumatic drive systems in connection with PMDs are thus superior to battery operated drive systems in many respects. Once again, pneumatic drive systems have the potential to provide quick, nearly unlimited recharging, lighter weight, lower cost, and smaller environmental impact. Further, pneumatic drive systems could strengthen individual independence and mobility. PMDs with pneumatic drive systems have potential to revolutionize powered mobility and replace many of the scooters and electric powered wheelchairs in use today, especially for scooters and Medicare coded Group 1 electric powered wheelchairs.

Pneumatic motors such as affordable, small, low-speed, high-torque, efficient rotary pneumatic motors are readily adapted for use in PMD. For example, modern radial piston gas motors (available, for example, from Bibus AG and from Deprag Schulz GMBH u. Co. of Amberg, Germany), turn gas pressure into torque, and are low-speed, high-torque drives. Pneumatics have significant advantages over electric powered motors including, but not limited to, good compliance, high torque to weight, high torque to volume, low inertia for fast cycling, safe dissipation of heat, shock and explosion proof, ease of maintenance, ability to withstanding overloading and continuous stalling, and a wide variety of transmission methods. As described above, pneumatic devices are also resilient to environmental hazards such as dirt, heat, water and moisture. Further, small high-pressure gas cylinders (for example, $CO_2$ and air) suitable for use in PMD hereof are readily available from a wide variety of sources.

The foregoing description and accompanying drawings set forth a number of representative embodiments at the present time. Various modifications, additions and alternative designs will, of course, become apparent to those skilled in the art in light of the foregoing teachings without departing from the scope hereof, which is indicated by the following claims rather than by the foregoing description. All changes and variations that fall within the meaning and range of equivalency of the claims are to be embraced within their scope.

What is claimed is:

1. A personal mobility device comprising:
   a frame;
   a plurality of wheels attached to the frame and comprising a first drive wheel;
   a first pneumatic motor in operative connection with the first drive wheel, the first pneumatic motor comprising a first forward port and a first rearward port;
   at least one tank of pressurized gas comprising an outlet;
   a regulator in fluid connection with the outlet of the tank of pressurized gas, the regulator decreasing pressure from a pressure of the tank of pressurized gas to a lower pressure, and
   a control system comprising a manually operated actuator, a first forward control valve having an inlet in fluid connection with the regulator and an outlet in fluid connection with the first forward port, a first rearward control valve having an inlet in fluid connection with the regulator and an outlet in fluid connection with the first rearward port, wherein movement of the manually operated actuator controls actuation of the first forward control valve and the first rearward control valve, wherein actuation of the first forward control valve causes pressurized gas to flow from the regulator into first forward port during forward motion of the first drive wheel and actuation of the first rearward control valve causes pressurized gas to flow from the regulator into first rearward port during rearward motion of the first drive wheel.

2. The personal mobility device of claim 1 comprising:
   a second pneumatic motor in operative connection with a second drive wheel, the second pneumatic motor comprising a second forward port and a second rearward port;
   the control system further comprising a second forward control valve having an inlet in fluid connection with the regulator and an outlet in fluid connection with the second forward port, and a second rearward control valve having an inlet in fluid connection with the regulator and an outlet in fluid connection with the second rearward port, and wherein movement of the manually operated actuator also controls actuation of the second forward control valve and the second rearward control valve and thereby flow of gas from the regulator to the second forward port and the second rearward port, wherein actuation of the second forward control valve causes pressurized gas to flow into second forward port during forward motion of the second drive wheel and actuation of the second rearward control valve causes pressurized gas to flow into second rearward port during rearward motion of the second drive wheel.

3. The personal mobility device of claim 2 wherein the first pneumatic motor is a first rotary piston pneumatic motor and the second pneumatic motor is a second rotary piston pneumatic motor.

4. The personal mobility device of claim 3 wherein the manually operated actuator controls the first forward control valve, the first rearward control valve, the second forward control valve and the second rearward control valve to effect differential steering.

5. The personal mobility device of claim 3 wherein the manually operated actuator comprises a joystick or a wig-wag controller.

6. The personal mobility device of claim 3 wherein the manually operated actuator comprises a lever arm extending between a portion configured to be manually contacted by an operator and a directional control valve actuator, wherein movement of the directional control valve actuator controls actuation of the first forward control valve, the first rearward control valve, the second forward control valve, and the second rearward control valve and thereby flow of gas from the regulator to the first forward port, the first rearward port, the second forward port and the second rearward port to effect differential steering.

7. The personal mobility device of claim 6 wherein each of the first forward control valve, the first rearward control valve, the second forward control valve, and the second rearward control valve comprises a flow actuator and a follower in operative connection with the flow actuator, the follower of each of the first forward control valve, the first rearward control valve, the second forward control valve, and the second rearward control valve being in contact with a surface of the directional control valve actuator which has a predetermined surface conformation configured to provide a predetermined output for each of the first forward control valve, the first rearward control valve, the second forward control valve, and the second rearward control valve as determined by manipulation of the portion of the manually operated actuator configured to be contacted by the operator.

8. The personal mobility device of claim 7 wherein the control system comprises a main flow control valve having an inlet in fluid connection with the regulator and an outlet in fluid connection with the inlet of the first forward control valve, the inlet of the first rearward control valve, the inlet of the second forward control valve, and the inlet of the second rearward control valve.

9. The personal mobility device of claim 8 wherein the control system further comprises an on/off valve having an inlet in fluid connection with the regulator and an outlet in fluid connection with the inlet of the main flow control valve.

10. The personal mobility device of claim 3 further comprising a braking system to resist rotation of at least one of the first drive wheel and the second drive wheel.

11. The personal mobility device of claim 10 further comprising a brake system actuator to actuate the braking system comprising a valve in fluid connection with the regulator which actuates the braking system when no pressurized gas flows to the first pneumatic motor or to the second pneumatic motor.

12. The personal mobility device of claim 11 wherein no pressurized gas flows to the first pneumatic motor or to the second pneumatic motor at a predetermined resting position of the manually operated actuator, the predetermined resting position occurring in the absence of manipulation of the manually operated actuator by an operator.

13. The personal mobility device of claim 10 wherein the brake system actuator is in fluid connection with a valve system which activates the valve of the brake system actuator when three of the first forward control valve, the first rearward control valve, the second forward control valve, and the second rearward control valve are in a non-activated state, wherein no pressurized gas flows therethrough to the first pneumatic motor or to the second pneumatic motor as controlled by a predetermined resting position of the manually operated actuator, the predetermined resting position occurring in the absence of manipulation of the manually operated actuator by an operator.

14. The personal mobility device of claim 13 wherein the braking system comprises a first brake operatively connected to the first drive wheel and a second brake operatively connected to the second drive wheel, the first brake and the second brake being actuated when the manually operated actuator is in the predetermined resting position.

15. The personal mobility device of claim 7 further comprising a braking system to resist rotation of at least one of the first drive wheel and the second drive wheel.

16. The personal mobility device of claim 15 further comprising a brake system actuator to actuate the braking system comprising a valve in fluid connection with the outlet of the main flow control valve, and in fluid connection with a valve system which activates the valve of the brake system actuator when three of the first forward control valve, the first rearward control valve, the second forward control valve, and the second rearward control valve are in a non-activated state, wherein no pressurized gas flows therethrough to the first pneumatic motor or to the second pneumatic motor as controlled by a predetermined resting position of the manually operated actuator, the predetermined resting position occurring in the absence of manipulation of the manually operated actuator by the operator.

17. The personal mobility device of claim 15 wherein the braking system comprises a first brake operatively connected to the first drive wheel and a second brake operatively connected to the second drive wheel, the first brake and the second brake being actuated when the manually operated actuator is in the predetermined resting position.

18. The personal mobility device of claim 7 wherein each of the first forward control valve, the first rearward control valve, the second forward control valve, and the second rearward control valve comprises a lever arm rotatably attached thereto, the follower being attached at an end of the lever arm, and wherein no greater than 10 Newtons of force is required to manually manipulate the manually operated actuator.

19. The personal mobility device of claim 3 further comprising a coupler comprising a first connector and a second connector which cooperates with the first connector to form a releasable connection therebetween, the first connector comprising a plurality of ports wherein each of the plurality of ports is in fluid connection with only one of a plurality of tubing lines in fluid connection with the control system, the second connector comprising a plurality of cooperating ports wherein each of the plurality of cooperating ports of the second connector is configured to form a sealed connection with only one of the plurality of ports of the first connector when the second connector is connected to the first connector.

20. The personal mobility device of claim 19 wherein one of the plurality of ports is in fluid connection with the outlet of the first forward control valve, one of the plurality of ports of the first connector is in fluid connection with the outlet of the first rearward control valve, one of the plurality of ports is in fluid connection with the outlet of the second forward control valve, and one of the plurality of ports of the first connector is in fluid connection with the outlet of the second rearward control valve.

21. The personal mobility device claim 3 wherein the control system comprises a housing in which the first forward control valve, the first rearward control valve, the second forward control valve, and the second rearward control valve are positioned, exhaust from at least one of the first forward control valve, the first rearward control valve, the second forward control valve, and the second rearward control valve maintaining a positive pressure within the housing during a period of time wherein the at least one of the first forward control valve, the first rearward control valve, the second forward control valve, and the second rearward control valve is activated by the manually operated actuator.

22. A personal mobility device comprising:
a frame;
a plurality of wheels attached to the frame and comprising a first drive wheel;
a first pneumatic motor in operative connection with the first drive wheel;
a source pressurized gas;
a control system comprising a manually operated actuator to control flow of gas from the source of pressurized gas to the first pneumatic motor, and
a braking system actuator to actuate the braking system comprising a valve in fluid connection with the source of pressurized gas, the valve of the braking system actuator being in fluid connection with a valve system which activates the valve of the brake system actuator to actuate the braking system each time the manual operated actuator is in a predetermined resting state, the predetermined resting state occurring in the absence of manipulation of the manually operated actuator by an operator.

23. A personal mobility device comprising:
a frame;
a plurality of wheels attached to the frame and comprising a first drive wheel on a first side of the frame and a second drive wheel on a second side of the frame;
a first pneumatic motor in operative connection with the first drive wheel;
a second pneumatic motor in operative connection with the second drive wheel;
a source pressurized gas;
a control system comprising a manually operated actuator having a control valve actuator attached thereto, and a plurality of control valves in operative connection with the manually operated actuator, at least one of the plurality of control valves controlling flow of pressurized gas from the source of pressurized gas to the first pneumatic motor and at least one other of the plurality of control valves controlling flow of pressurized gas from the source of pressurized gas to the second pneumatic motor, wherein each of the plurality of control valves comprises a flow actuator and a follower in operative connection with the flow actuator, the follower of each of the plurality of control valves being in contact with a surface of the control valve actuator which has a predetermined surface conformation configured to provide a predetermined output for each of the plurality of control valves as determined by manipulation of the portion of the manually operated actuator configured to be contacted by an operator.

* * * * *